United States Patent
Sasai et al.

(10) Patent No.: US 9,800,900 B2
(45) Date of Patent: Oct. 24, 2017

(54) IMAGE DECODING METHOD, IMAGE CODING METHOD, IMAGE DECODING APPARATUS, IMAGE CODING APPARATUS, AND IMAGE CODING AND DECODING APPARATUS

(71) Applicant: Panasonic Intellectual Property Corporation of America, Torrance, CA (US)

(72) Inventors: Hisao Sasai, Osaka (JP); Takahiro Nishi, Nara (JP); Youji Shibahara, Tokyo (JP); Kyoko Tanikawa, Osaka (JP); Toshiyasu Sugio, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 14/960,698

(22) Filed: Dec. 7, 2015

(65) Prior Publication Data

US 2016/0088317 A1    Mar. 24, 2016

Related U.S. Application Data

(62) Division of application No. 13/962,175, filed on Aug. 8, 2013, now Pat. No. 9,237,341.

(Continued)

(51) Int. Cl.
*H04N 7/18*     (2006.01)
*H04N 19/91*    (2014.01)
(Continued)

(52) U.S. Cl.
CPC ............. *H04N 19/91* (2014.11); *H04N 19/13* (2014.11); *H04N 19/136* (2014.11);
(Continued)

(58) Field of Classification Search
CPC ... H04N 7/26106; H04N 7/26244; H04N 7/50
(Continued)

(56) References Cited

U.S. PATENT DOCUMENTS 6,654,500 B1    11/2003 Lyu
2003/0194012 A1  10/2003 Sakai et al.
(Continued)

FOREIGN PATENT DOCUMENTS

WO    2010/041472    4/2010

OTHER PUBLICATIONS

Benjamin Bross et al., "High efficiency video coding (HEVC) text specification draft 8", Joint Collaborative Team on Video Coding (JCT-VC) of ITU-T SG16 WP3 and ISO/IEC JTC1/SC29/WG11, JCTVC-J1003_d7, Ver.8, 10th Meeting: Stockholm, SE, Jul. 11-20, 2012.

(Continued)

*Primary Examiner* — Andy Rao
(74) *Attorney, Agent, or Firm* — Wenderoth, Lind & Ponack, L.L.P.

(57) ABSTRACT

An image decoding method of decoding, on a per-block basis, a coded image included in a bitstream, includes: performing arithmetic decoding on a current block to be decoded; determining whether or not the current block is at the end of a slice; determining, when it is determined that the current block is not at the end of the slice, whether or not the current block is at the end of a sub-stream which is a structural unit of the image that is different from the slice; and performing arithmetic decoding on a sub-last bit and performing arithmetic decoding termination, when it is determined that the current block is at the end of the sub-stream.

4 Claims, 34 Drawing Sheets

Related U.S. Application Data

(60) Provisional application No. 61/681,206, filed on Aug. 9, 2012.

(51) Int. Cl.
- *H04N 19/70* (2014.01)
- *H04N 19/13* (2014.01)
- *H04N 19/174* (2014.01)
- *H04N 19/436* (2014.01)
- *H04N 19/136* (2014.01)

(52) U.S. Cl.
CPC ......... *H04N 19/174* (2014.11); *H04N 19/436* (2014.11); *H04N 19/70* (2014.11)

(58) Field of Classification Search
USPC ........................................ 375/240.23–240.28
See application file for complete search history.

(56) References Cited

U.S. PATENT DOCUMENTS

| | | |
|---|---|---|
| 2004/0059770 A1 | 3/2004 | Bossen |
| 2009/0232205 A1 | 9/2009 | Chiba |
| 2010/0246662 A1 | 9/2010 | Koto et al. |
| 2010/0254620 A1 | 10/2010 | Iwahashi et al. |
| 2012/0014429 A1 | 1/2012 | Zhao et al. |
| 2012/0140813 A1 | 6/2012 | Sole Rojals et al. |
| 2012/0189049 A1 | 7/2012 | Coban et al. |
| 2013/0114735 A1 | 5/2013 | Wang |
| 2014/0010277 A1 | 1/2014 | Wang et al. |
| 2014/0334557 A1 | 11/2014 | Schierl et al. |

OTHER PUBLICATIONS

"Advanced video coding for generic audiovisual services", ITU-T Recommendation H. 264, Mar. 2010.

Chih-Wei Hsu et al., "AHG4/AHG9: Syntax for restricting slices and WPP", Joint Collaborative Team on Video Coding (JCT-VC) of ITU-T SG16 WP3 and ISO/IEC JTC1/SC29/WG11 JCTVC-J0040, ITU-T, Jul. 10, 2012, pp. 1-5.

Gordon Clare et al., "On WPP support in the Main profile", Joint Collaborative Team on Video Coding (JCT-VC) of ITU-T SG16 WP3 and ISO/IEC JTC1/SC29/WG11 JCTVC-J0575, ITU-T, Jul. 18, 2012, pp. 1-2.

Kengo Terada et al., "CABAC termination for the end of tile/WPP", Joint Collaborative Team on Video Coding (JCT-VC) of ITU-T SG16 WP3 and ISO/IEC JTC1/SC29/WG11 JCTVC-K0182, ITU-T, Oct. 14, 2012, pp. 1-2.

International Search Report issued Sep. 17, 2013 in corresponding International Application No. PCT/JP2013/004777.

Extended European Search Report issued Jul. 16, 2015 in European Application No. 13827144.0.

Gordon Clare et al., "Wavefront and Cabac Flush: Different Degrees of Parallelism Without Transcoding", Joint Collaborative Team on Video Coding (JCT-VC) of ITU-T SG16 WP3 and ISO/IEC JTC1/SC29/WG11, JCTVC-F275, m20695, 6th Meeting: Torino, IT, Jul. 14-22, 2011, XP030009298.

Hendry et al., "AHG4: Unified marker for Tiles' and WPP's entry points", Joint Collaborative Team on Video Coding (JCT-VC) of ITU-T SG16 WP3 and ISO/IEC JTC1/SC29/WG11, JCTVC-I0080, 9th Meeting: Geneva, CH, Apr. 27-May 7, 2012, XP030052664.

Stewart Worrall et al., "AHG8: Inclusion of Parallel Processing Schemes in the Main Profile", Joint Collaborative Team on Video Coding (JCT-VC) of ITU-T SG16 WP3 and ISO/IEC JTC1/SC29/WG11, JCTVC-I0153, 9th Meeting: Geneva, CH, Apr. 27-May 7, 2012, XP030052737.

B. Bross et al., "Text of ISO/IEC DIS 23008-2 High Efficiency Video Coding", MPEG Meeting: Jul. 16-20, 2012, Stockholm, SE, (Motion Picture Expert Group or ISO/IEC JTC1/SC29/WG11), No. N12935, Aug. 3, 2012, XP030019407.

Patent Examination Report No. 1 dated Sep. 2, 2016 issued for Australian patent application No. 2013300958.

Office Action dated Aug. 9, 2017 in Russian Patent Application No. 2015101429, with English-language translation.

FIG. 3A

| slice_data() { | | Descriptor |
|---|---|---|
| do { | | |
| coding_tree_unit() | 851 | ae(v) |
| end_of_slice_flag | 852 | |
| CtbAddrTS++ | | |
| CtbAddrRS = CtbAddrTStoRS[ CtbAddrTS ] | | |
| if(!end_of_slice_flag && ((tiles_enabled_flag && TileId[ CtbAddrTS ] != TileId[ CtbAddrTS - 1 ]) \|\| (entropy_coding_sync_enabled_flag && CtbAddrTS % PicWidthInCtbsY == 0))) | 853 | |
| byte_alignment() | 854 | |
| } while(!end_of_slice_flag) | | |
| } | | |

| byte_alignment() { | | Descriptor |
|---|---|---|
| bit_equal_to_one /* equalto 1 */ | 855 | f(1) |
| while(!byte_aligned() ) | | |
| bit_equal_to_zero /* equal to 0 */ | 856 | f(1) |
| } | | |

FIG. 9

| | Descriptor |
|---|---|
| slice_data() { | |
|   do { | |
|     coding_tree_unit() ~181 | |
|     end_of_slice_flag ~182 | ae(v) |
|     CtbAddrTS++ | |
|     CtbAddrRS = CtbAddrTStoRS[ CtbAddrTS ] ~183 | |
|     if(!end_of_slice_flag && ((tiles_enabled_flag && | |
|     TileId[ CtbAddrTS ] != TileId[ CtbAddrTS - 1 ]) \|\| | |
|     (entropy_coding_sync_enabled_flag && CtbAddrTS % PicWidthInCtbsY == 0))) | |
|     { | |
|       end_of_sub_stream_one_bit /* equal to 1 */ ~184 | ae(v) |
|       byte_alignment() ~185 | |
|     } | |
|   }while(!end_of_slice_flag) | |
| } | |

FIG. 10

| | Descriptor |
|---|---|
| byte_alignment() { | |
| bit_equal_to_one /* equal to 1 */ ~185a | ae(v) |
| while(!byte_aligned()) | |
| bit_equal_to_zero /* equal to 0 */ ~185b | f(1) |
| } | |

FIG. 22

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33

| Corresponding standard | Driving frequency |
|---|---|
| MPEG-4 AVC | 500 MHz |
| MPEG-2 | 350 MHz |
| ⋮ | ⋮ |

IMAGE DECODING METHOD, IMAGE CODING METHOD, IMAGE DECODING APPARATUS, IMAGE CODING APPARATUS, AND IMAGE CODING AND DECODING APPARATUS

FIELD

One or more exemplary embodiments disclosed herein relate generally to moving picture coding methods and moving picture decoding methods, and in particular, relate to an arithmetic coding method and an arithmetic decoding method.

BACKGROUND

The high efficiency video coding (HEVC) standard, which is a next-generation image coding standard, has been studied in various ways to increase its coding efficiency (see Non Patent Literature (NPL) 1). There are conventional international telecommunication union telecommunication standardization sector (ITU-T) standards typified by H.26x, and ISO/IEC standards typified by MPEG-x. The latest and most advanced image coding standard has been currently studied as a standard next to a standard typified by H.264/AVC or MPEG-4 AVC (see NPL 2).

In the HEVC standard, arithmetic coding referred to as context-based adaptive binary arithmetic coding (CABAC) is used as entropy coding.

CITATION LIST

Non Patent Literature

[Non Patent Literature 1] Joint Collaborative Team on Video Coding (JCT-VC) of ITU-T SG16 WP3 and ISO/IEC JTC1/SC29/WG11 10th Meeting: Stockholm, SE, 11-20 Jul. 2012, JCTVC-J1003_d7, "High efficiency video coding (HEVC) text specification draft 8"

[Non Patent Literature 2] ITU-T Recommendation H.264 "Advanced video coding for generic audiovisual services", March, 2010

SUMMARY

Technical Problem

However, a conventional image decoding method and a conventional image coding method have a problem of complexity in the configuration for performing processing according to the methods.

In view of this, one non-limiting and exemplary embodiment provides an image decoding method, an image coding method and others which are capable of decoding and coding images with simple configuration.

Solution to Problem

An image decoding method according to an aspect of the present disclosure is an image decoding method of decoding, on a per-block basis, a coded image included in a bitstream. The image decoding method includes: performing arithmetic decoding on a current block to be decoded; determining whether or not the current block is at an end of a slice; determining whether or not the current block is at an end of a sub-stream when it is determined that the current block is not at the end of the slice, the sub-stream being a structural unit of the image that is different from the slice; and performing arithmetic decoding on a sub-last bit and performing arithmetic decoding termination as first termination, when it is determined that the current block is at the end of the sub-stream.

These general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image decoding method and an image coding method according to the present disclosure simplify configuration for decoding or coding images.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a diagram showing slice syntax.

FIG. 3B is a diagram showing bitstream syntax in a slice.

FIG. 9 is a diagram showing an example of slice syntax according to Embodiment 1.

FIG. 10 is a diagram showing an example of bitstream syntax according to Variation of Embodiment 1.

FIG. 22 illustrates a structure of the multiplexed data.

FIG. 33 shows an example of a look-up table in which video data standards are associated with driving frequencies.

DESCRIPTION OF EMBODIMENTS (Underlying Knowledge Forming Basis of the Present Disclosure)

In relation to the conventional image decoding method and image coding method, the inventors have found the problem indicated below.

In arithmetic coding according to CABAC, ctxIdx, which is an index of a probability model referred to as context, and binVal, which is a binary signal to be coded, are input, and an output code string is determined through updates of codIRange, codILow, firstBitFlag, and BitsOutstanding which are information indicating internal probability states.

For the initial values of information of the internal probability state, codIRange=510, codILow=0, firstBitFlag=1, and BitsOutstanding=0 are set.

In contrast, in arithmetic decoding corresponding to CABAC, ctxIdx which is an index of the probability model, ctxIdxTable which is associated information, and bypassFlag which indicates whether bypass decoding has been applied to a current code string, are input, and a decoded binary signal bin is output through updates of codIRange and codIOffset which are information indicating the internal probability states.

As described above, in arithmetic coding and decoding in CABAC, coding or decoding is performed through updates of the internal probability states. Furthermore, when CABAC processing starts at a point other than the beginning in the processing, there are cases where the internal probability state of the same structural unit (a unit forming an image, and also referred to as a processing unit) may differ in coding and decoding. This hinders proper coding or decoding of images. Hence, termination is performed in coding and decoding.

In a method disclosed in NPL 1, in coding, arithmetic coding is performed on an end-of-slice flag (end_of_slice) indicating a value of 1, the end-of-slice flag is embedded in the end of a slice, and termination is performed. In decoding, arithmetic decoding is performed on the end-of-slice flag, and termination is performed. Accordingly, even when CABAC (arithmetic coding or arithmetic decoding) starts at a point other than the beginning in the processing, if the starting position is the beginning of a slice, it is possible to have the same internal probability state in coding and decoding.

However, the HEVC standard uses, other than slices, structural units referred to as tiles for parallel processing, and structural units (hereinafter, referred to as CTU lines) for allowing parallel processing referred to as wavefront parallel processing (WPP). In the HEVC standard, termination is not performed on the tiles and CTU lines.

Figure 1:
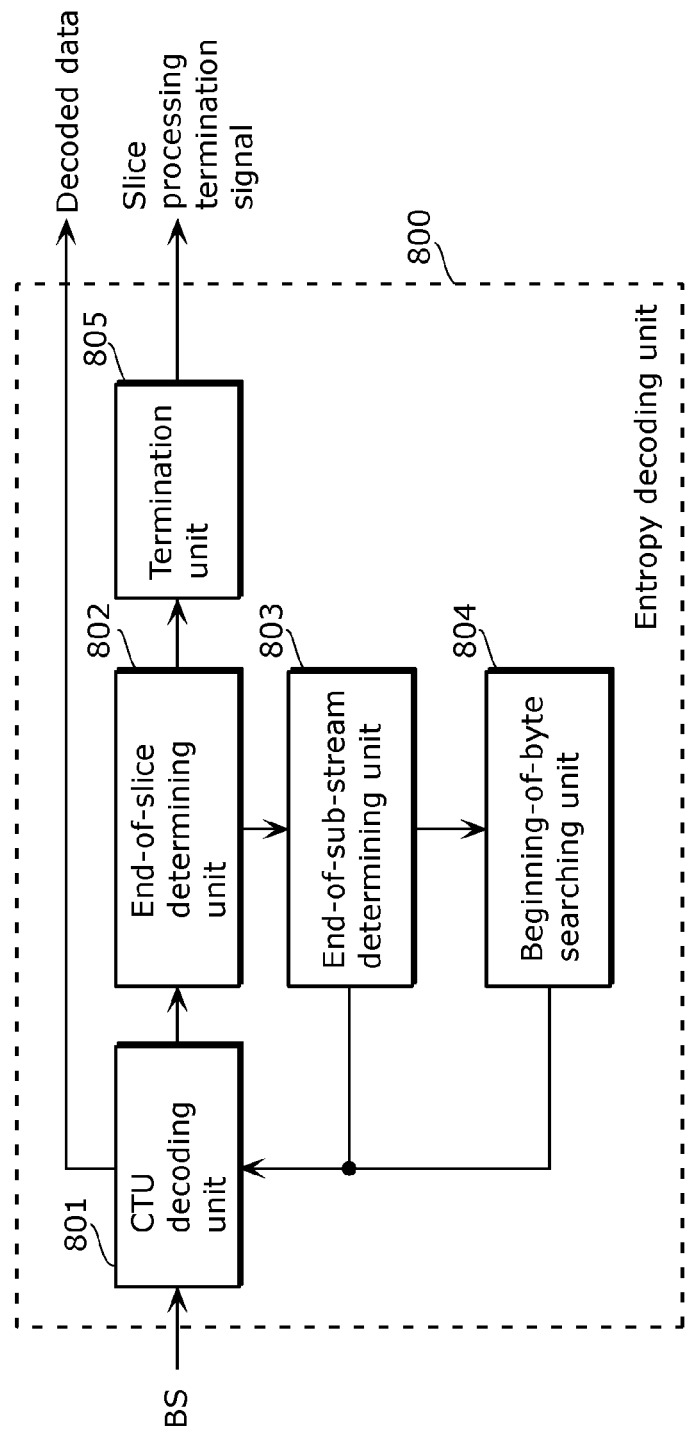
FIG. 1 is a block diagram showing a configuration of an entropy decoding unit.

FIG. 1 is a block diagram showing a configuration of an entropy decoding unit.

An entropy decoding unit 800 performs CABAC arithmetic decoding, and includes a CTU decoding unit 801, an end-of-slice determining unit 802, an end-of-sub-stream determining unit 803, a beginning-of-byte searching unit 804, and a termination unit 805.

Figure 2:
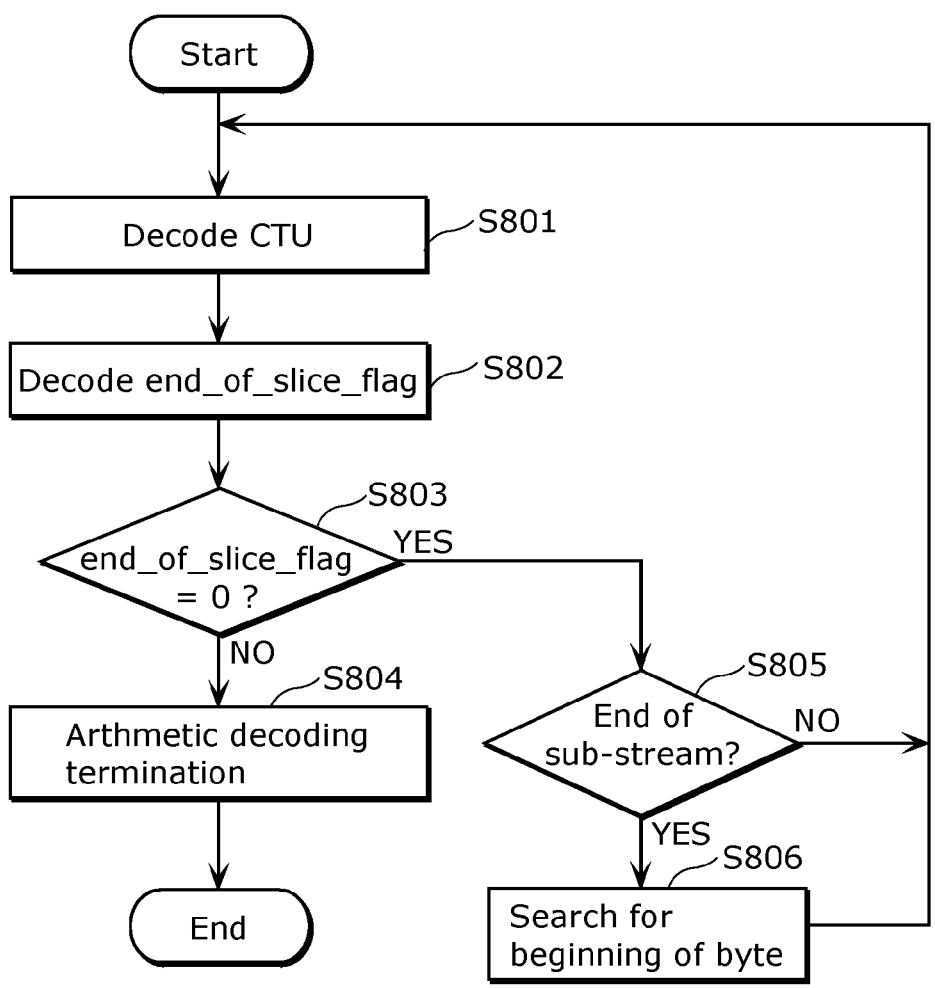
FIG. 2 is a flowchart of processing performed by the entropy decoding unit.

FIG. 2 is a flowchart of processing performed by the entropy decoding unit 800.

First, the CTU decoding unit 801 in the entropy decoding unit 800 performs arithmetic decoding on a coding tree unit (CTU) in a bitstream BS (Step S801). A CTU refers to a block forming a picture. Subsequently, the end-of-slice determining unit 802 performs arithmetic decoding on an end-of-slice flag (end_of_slice_flag) (Step S802). The end-of-slice determining unit 802 then determines whether or not the decoded end-of-slice flag (end_of_slice_flag) indicates 0 (Step S803). When it is determined that the end-of-slice flag does not indicate 0 (No in Step S803), the termination unit 805 performs termination of arithmetic decoding (arithmetic decoding termination) (Step S804). On the other hand, when it is determined that the end-of-slice flag indicates 0 (Yes in Step S803), the end-of-sub-stream determining unit 803 determines whether or not the CTU which was arithmetically decoded immediately before is at the end of a sub-stream (Step S805). A sub-stream refers to the tile or CTU line described above. The CTU line is a structural unit including horizontally aligned CTUs.

Here, when it is determined that the CTU is at the end of a sub-stream (Yes in Step S805), the beginning-of-byte searching unit 804 searches for the beginning of a byte (beginning-of-byte search) (Step S806). This beginning-of-byte search refers to processing of searching a bitstream for the beginning of a byte unit while skipping bit string. On the other hand, when it is determined that the CTU is not at the end of a sub-stream (No in Step S805) or after Step S806, the entropy decoding unit 800 repeats processing from Step 801 on a next CTU.

FIG. 3A is a diagram showing slice syntax.

The slice includes data 851 indicating a coded CTU (coding_tree_unit( )) and an arithmetically coded end-of-slice flag 852 (end_of_slice_flag) for determining the end of a slice. The slice also includes a predetermined bit string 854 (byte_alignment( )) when a condition 853 is satisfied. The condition 853 is a condition that the CTU indicated by the data 851 is at the end of a sub-stream.

FIG. 3B is a diagram showing syntax of the bit string 854.

The bit string 854 includes a bit 855 indicating a value of 1 (bit_equal_to_one) and as many bits 856 indicating values of 0 (bit_equal_to_zero) as are necessary. The bit string 854 is included in a bitstream so that the number of bits of the coded sub-stream is equal to an integral multiple of a byte unit. The bit string 854 has not been arithmetically coded, and is a code indicating a value of 0 or 1. In the beginning-of-byte search, the bit string 854 is skipped.

Figure 4:
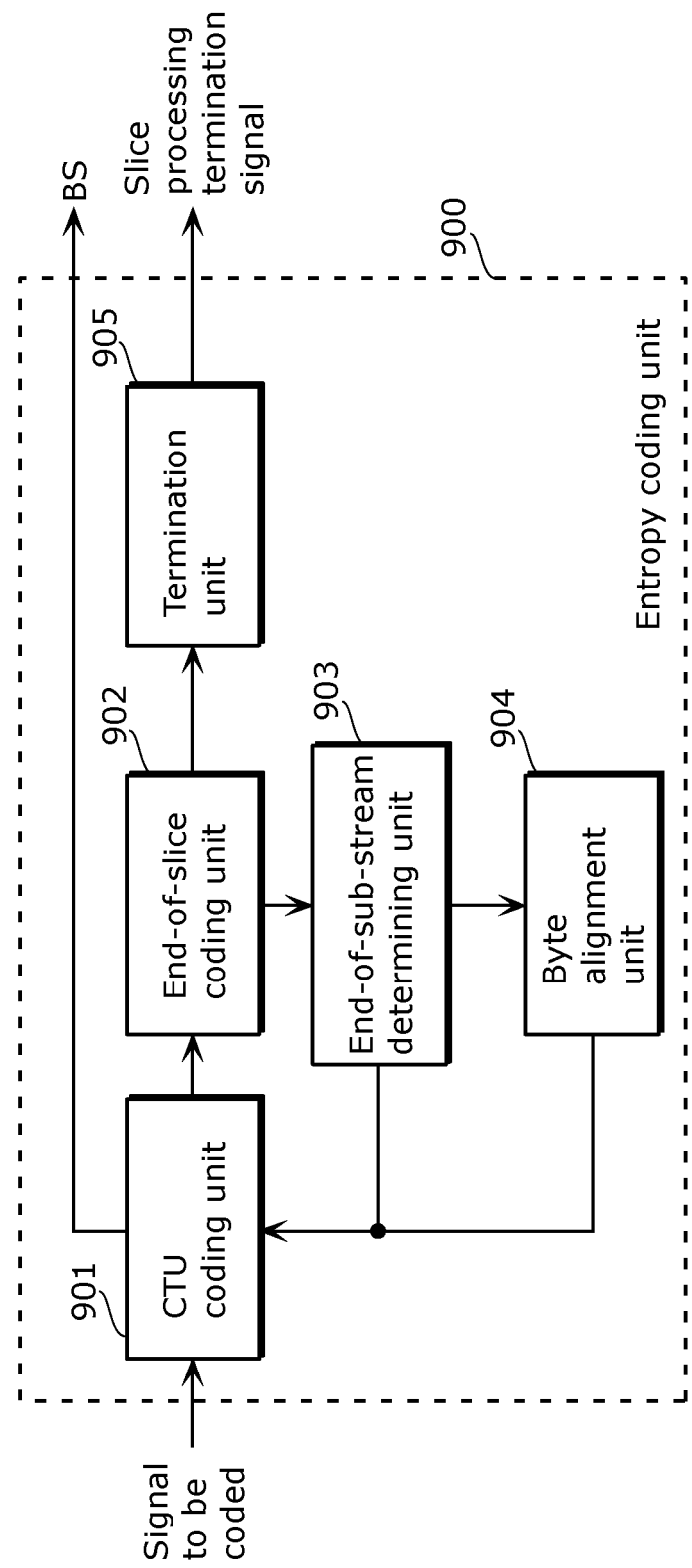
FIG. 4 is a block diagram showing a configuration of an entropy coding unit.

FIG. 4 is a block diagram showing a configuration of an entropy coding unit.

An entropy coding unit 900 performs CABAC arithmetic coding, and includes a CTU coding unit 901, an end-of-slice coding unit 902, an end-of-sub-stream determining unit 903, a byte alignment unit 904, and a termination unit 905.

Figure 5:
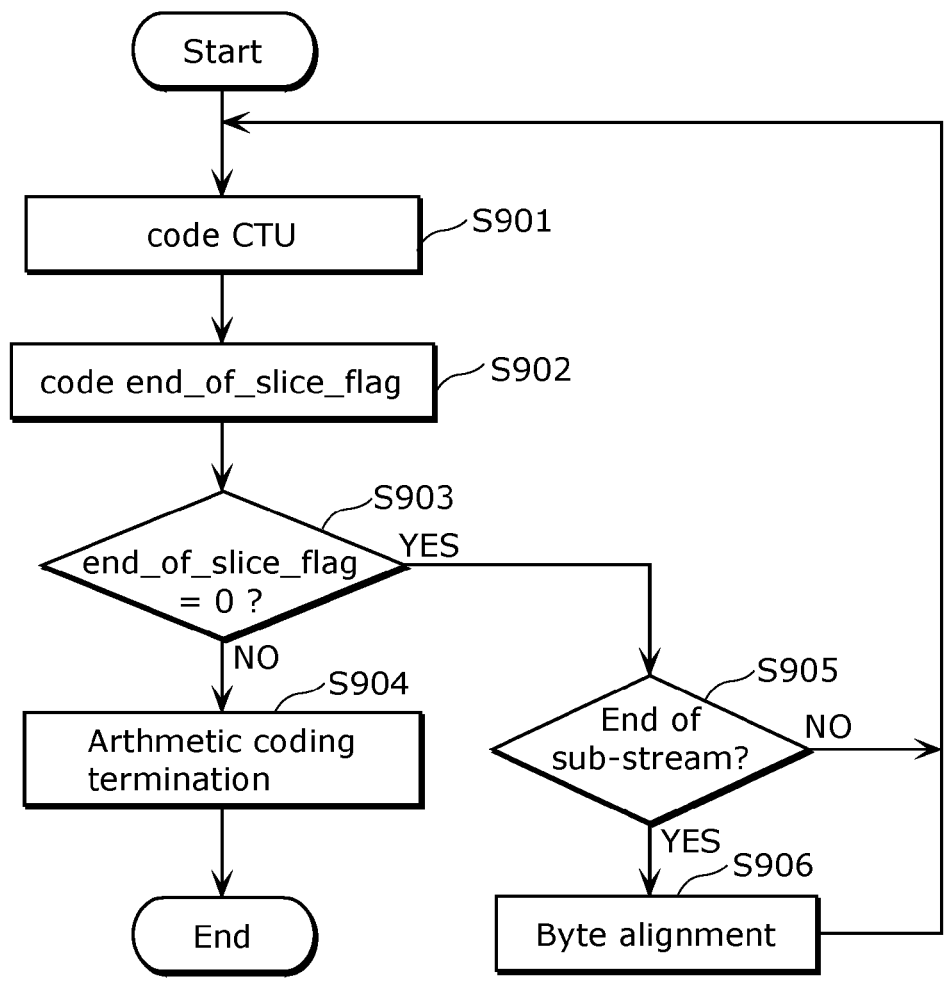
FIG. 5 is a flowchart of processing performed by the entropy coding unit.

FIG. 5 is a flowchart of processing performed by the entropy coding unit 900.

First, the CTU coding unit 901 in the entropy coding unit 900 performs arithmetic coding on a CTU in a current signal to be coded (Step S901). Subsequently, the end-of-slice determining unit 902 performs arithmetic coding on an end-of-slice flag (end_of_slice_flag) (Step S902). The end-of-slice coding unit 902 then determines whether or not the end-of-slice flag (end_of_slice_flag) indicates 0 (Step S903). Here, when it is determined that the end-of-slice flag does not indicate 0 (No in Step S903), the termination unit 905 performs termination of arithmetic coding (arithmetic coding termination) (Step S904). On the other hand, when it is determined that the end-of-slice flag indicates 0 (Yes in Step S903), the end-of-sub-stream determining unit 903 determines whether or not the CTU which was arithmetically coded immediately before is at the end of a sub-stream (Step S905).

Here, when it is determined that the CTU is at the end of a sub-stream (Yes in S905), the byte alignment unit 904 performs byte alignment (Step S906). When it is determined that the CTU is not at the end of a sub-stream (No in Step S905) or after Step S906, the entropy coding unit 900 repeats processing from S901 on a next CTU.

In the image decoding method and the image coding method described above, termination is not performed after performing arithmetic decoding or arithmetic coding on the CTU that is at the end of a sub-stream. Hence, for example, when a plurality of sub-streams are processed in parallel, processing starts at a point other than the beginning in a bitstream BS or a signal to be coded. As a result, the internal probability state of CABAC corresponding to a given sub-stream may differ in coding and decoding. More specifically, proper image coding and decoding cannot be performed.

In order to solve such a problem, each slice may be divided into smaller units without using sub-streams. However, in such a case, coding efficiency decreases, which is another problem.

Another method to solve the problem is to simply perform termination after performing arithmetic decoding or arithmetic coding on a CTU that is at the end of a sub-stream. However, in this case, an additional processing unit is necessary for performing termination on the end of the sub-stream, which results in complicated configuration.

In order to solve such problems, an image decoding method according to an aspect of the present disclosure is an image decoding method of decoding, on a per-block basis, a coded image included in a bitstream. The image decoding method includes: performing arithmetic decoding on a current block to be decoded; determining whether or not the current block is at an end of a slice; determining whether or not the current block is at an end of a sub-stream when it is determined that the current block is not at the end of the slice, the sub-stream being a structural unit of the image that is different from the slice; and performing arithmetic decoding on a sub-last bit and performing arithmetic decoding termination as first termination, when it is determined that the current block is at the end of the sub-stream.

With this, even when an arithmetically decoded block is not at the end of a slice, if the block is at the end of a sub-stream, arithmetic decoding termination is performed. This allows a plurality of sub-streams in a bitstream to be properly decoded in parallel. Furthermore, it is possible to properly decode a bitstream coded with less decrease in efficiency, by using slices and sub-streams. Furthermore, processing, including arithmetic decoding of the sub-last bit and termination, is performed on the end of a sub-stream. Hence, when processing, including arithmetic decoding of a flag and termination, is performed on the end of a slice, common processing can be performed on the end of a sub-stream and the end of a slice. More specifically, since an additional processing unit is not necessary for processing performed on the end of a sub-stream, images can be decoded with simple configuration.

Furthermore, it may be that the image decoding method further includes performing arithmetic decoding termination as second termination when it is determined that the current block is at the end of the slice, and that when the first termination is performed, same processing as the second termination is performed.

With this, the termination performed on the end of a slice is the same as the termination performed on the end of a sub-stream. This allows simpler configuration for decoding images.

Furthermore, it may be that the image decoding method further includes performing arithmetic decoding on an end-of-slice flag indicating whether or not the current block is at the end of the slice, and that in the determining of whether or not the current block is at an end of a slice, it is determined that the current block is at the end of the slice when the end-of-slice flag on which arithmetic decoding has been performed indicates a predetermined value, and in the performing of arithmetic decoding on a sub-last bit, a same value as the predetermined value is restored by the arithmetic decoding. For example, it may be that in the performing of arithmetic decoding on a sub-last bit, a value of 1 is restored by the arithmetic decoding.

Accordingly, the termination performed on the end of a slice and the termination performed on the end of a sub-stream are executed when the same value is obtained in the arithmetic decoding of 1-bit. Hence, more processing can be shared in processing performed on the end of a sub-stream and the end of a slice.

Furthermore, it may be that the image decoding method further includes skipping a bit string after performing the first termination, the bit string being written into the bitstream so that a bit length including the sub-stream and the sub-last bit is equal to a multiple of predetermined N bits.

With this, for example, beginning-of-byte search is performed, allowing proper decoding of each byte unit.

Furthermore, it may be that in the performing of arithmetic decoding on a sub-last bit, arithmetic decoding is performed on a first bit of the bit string, as the sub-last bit.

Accordingly, it is not necessary to include an additional bit in a bitstream as a sub-last bit; and thus, it is possible to properly decode a bitstream coded with less decrease in efficiency.

Furthermore, in order to solve the problems, an image coding method according to one aspect of the present disclosure is an image coding method of coding an image on a per-block basis to generate a bitstream. The image coding method includes: performing arithmetic coding on a current block to be coded; determining whether or not the current block is at an end of a slice; determining whether or not the current block is at an end of a sub-stream when it is determined that the current block is not at the end of the slice, the sub-stream being a structural unit of the image that is different from the slice; and performing arithmetic coding on a sub-last bit and performing arithmetic coding termination as first termination, when it is determined that the current block is at the end of the sub-stream.

With this, even if an arithmetically coded block is not at the end of a slice, if the block is at the end of a sub-stream, arithmetic coding termination is performed. This allows a plurality of sub-streams in a bitstream to be properly coded in parallel. Furthermore, it is possible to suppress a decrease in coding efficiency by using slices and sub-streams. Furthermore, processing, including arithmetic coding of the sub-last bit and termination, is performed on the end of the sub-stream. Hence, when processing, including arithmetic coding of a flag and termination, is performed on the end of a slice, common processing can be performed on the end of the sub-stream and the end of the slice. More specifically, since an additional processing unit is not necessary for processing performed on the end of a sub-stream, images can be coded with simple configuration.

Furthermore, it may be that the image coding method further includes performing arithmetic coding termination as second termination when it is determined that the current block is at the end of the slice, and that when the first termination is performed, same processing as the second termination is performed.

With this, the termination performed on the end of a slice is the same as the termination performed on the end of a sub-stream. This allows simpler configuration for coding images.

Furthermore, it may be that the image coding method further includes: performing arithmetic coding on an end-of-slice flag indicating whether or not the current block is at the end of the slice, and that in the determining of whether the current block is at an end of a slice, it is determined that the current block is at the end of the slice when the end-of-slice flag indicates a predetermined value, and in the performing of arithmetic decoding on a sub-last bit, arithmetic coding is performed on the sub-last bit indicating a same value as the predetermined value. For example, it may be that in the performing of arithmetic coding on a sub-last bit, arithmetic coding is performed on the sub-last bit indicating a value of 1.

Accordingly, the termination performed on the end of a slice and the termination performed on the end of a sub-stream are executed when arithmetic coding is performed on 1-bit indicating the same value. Hence, more processing can be shared in processing performed on the end of the sub-stream and the end of the slice.

Furthermore, it may be that the image coding method further includes writing a bit string into the bitstream after performing the first termination so that a bit length including the sub-stream and the sub-last bit is equal to a multiple of predetermined N bits.

With this, for example, it is possible to properly perform coding of each byte unit.

Furthermore, it may be that in the performing of arithmetic coding on a sub-last bit, arithmetic coding is performed on a first bit of the bit string, as the sub-last bit.

Accordingly, it is not necessary to include an additional bit in a bitstream as a sub-last bit; and thus, it is possible to suppress a decrease in coding efficiency.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements. In the following description, the term "coding" may refer to "encoding".

Embodiment 1

Figure 6:
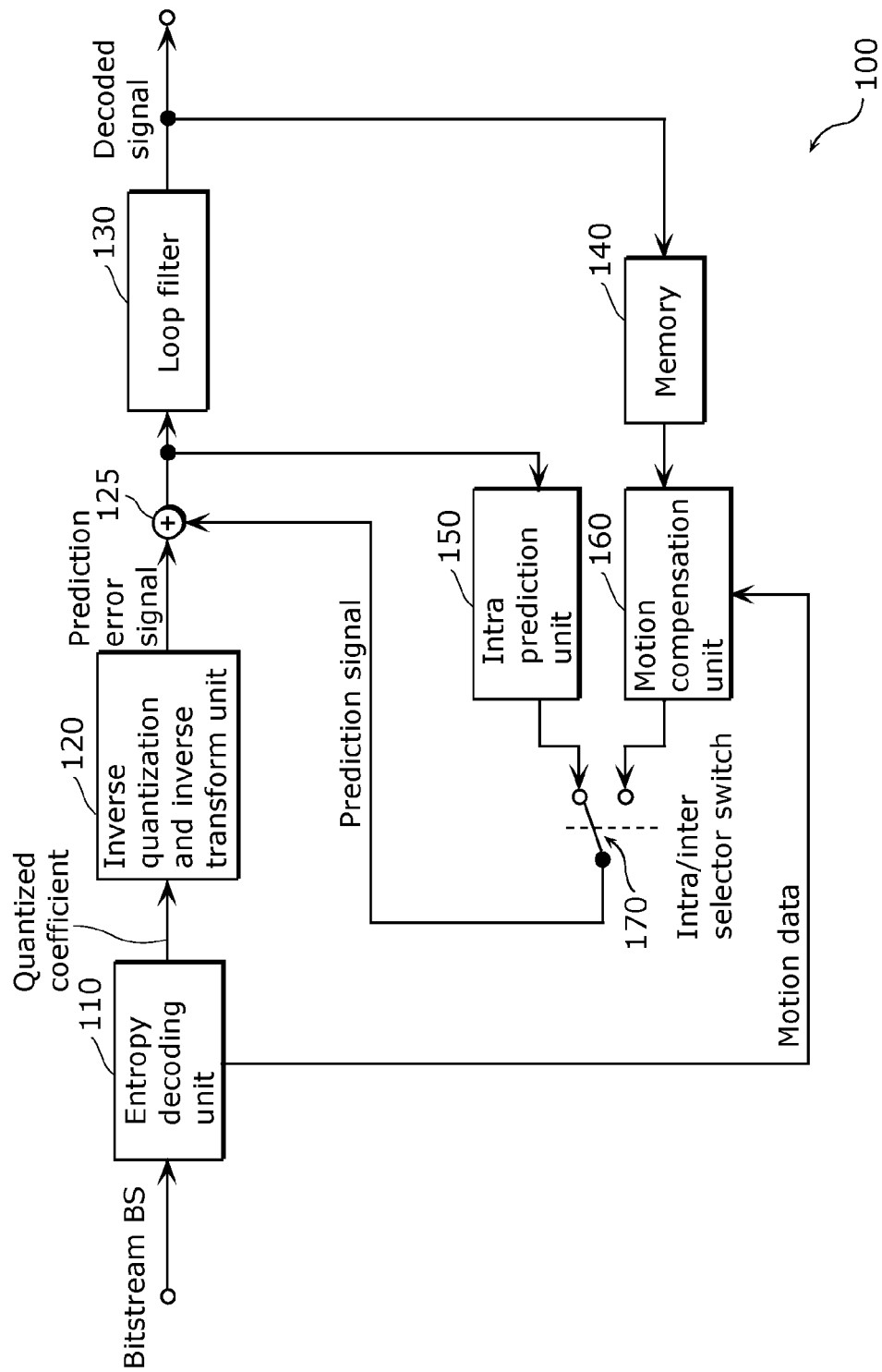
FIG. 6 is a block diagram showing an example of a configuration of an image decoding apparatus according to Embodiment 1.

FIG. 6 is a block diagram showing an example of a configuration of an image decoding apparatus according to Embodiment 1.

An image decoding apparatus 100 according to Embodiment 1 decodes a bitstream BS that is compression-coded image data. For example, the image decoding apparatus 100 decodes the bitstream BS on a per-block basis. More specifically, the image decoding apparatus 100 restores image data by performing variable-length decoding, inverse quantization, inverse transform and others on a current block to be coded.

As shown in FIG. 6, the image decoding apparatus 100 includes an entropy decoding unit 110, an inverse quantization and inverse transform unit 120, an adder 125, a loop filter 130, a memory 140, an intra prediction unit 150, a motion compensation unit 160, and an intra/inter selector switch 170.

The entropy decoding unit 110 performs variable-length decoding on a bitstream BS, and restores, per block, quantized coefficients in the block. The entropy decoding unit 110 obtains motion data from the bitstream BS, and outputs the obtained motion data to the motion compensation unit 160.

The inverse quantization and inverse transform unit 120 restores transform coefficients by performing inverse quantization on the quantized coefficients restored by the entropy decoding unit 110. The inverse quantization and inverse transform unit 120 performs inverse transform (inverse frequency transform) on the restored transform coefficients. Accordingly, a prediction error signal corresponding to a different one of blocks in the bitstream BS is restored.

The adder 125 generates a decoded image by adding the restored prediction error signal and a prediction signal.

The loop filter 130 performs loop filtering, such as deblocking filtering, on the generated decoded image. The decoded image on which loop filtering has been performed is output as a decoded signal.

The memory 140 is a memory for storing reference images to be used for motion compensation. More specifically, the memory 140 stores, as a reference image, a decoded image on which loop filtering has been performed.

The intra prediction unit 150 generates a prediction signal (intra prediction signal) by performing intra prediction according to an intra prediction mode. More specifically, the intra prediction unit 150 refers to images neighboring a current block to be decoded in the decoded image generated by the adder 125, to perform intra prediction on the current block. Accordingly, the intra prediction unit 150 generates an intra prediction signal.

The motion compensation unit 160 generates a prediction signal (inter prediction signal) of the current block by performing motion compensation based on the motion data output from the entropy decoding unit 110.

The intra/inter selector switch 170 selects the intra prediction signal or inter prediction signal, and outputs the selected signal to the adder 125 as a prediction signal.

With the above configuration, the image decoding apparatus 100 according to Embodiment 1 decodes compression-coded image data.

Here, the entropy decoding unit 110 in the image decoding apparatus 100 according to Embodiment 1 performs variable-length decoding on a bitstream BS by performing arithmetic decoding on the bitstream BS.

In arithmetic decoding performed by the entropy decoding unit 110 according to Embodiment 1, the bitstream BS can be properly decoded both in parallel processing and serial processing. Hence, when sub-streams are used and high-speed processing is necessary in the HEVC, implementation of arithmetic decoding according to Embodiment 1 is highly beneficial.

Hereinafter, a detailed description is given of arithmetic decoding performed by the entropy decoding unit 110.

Figure 7:
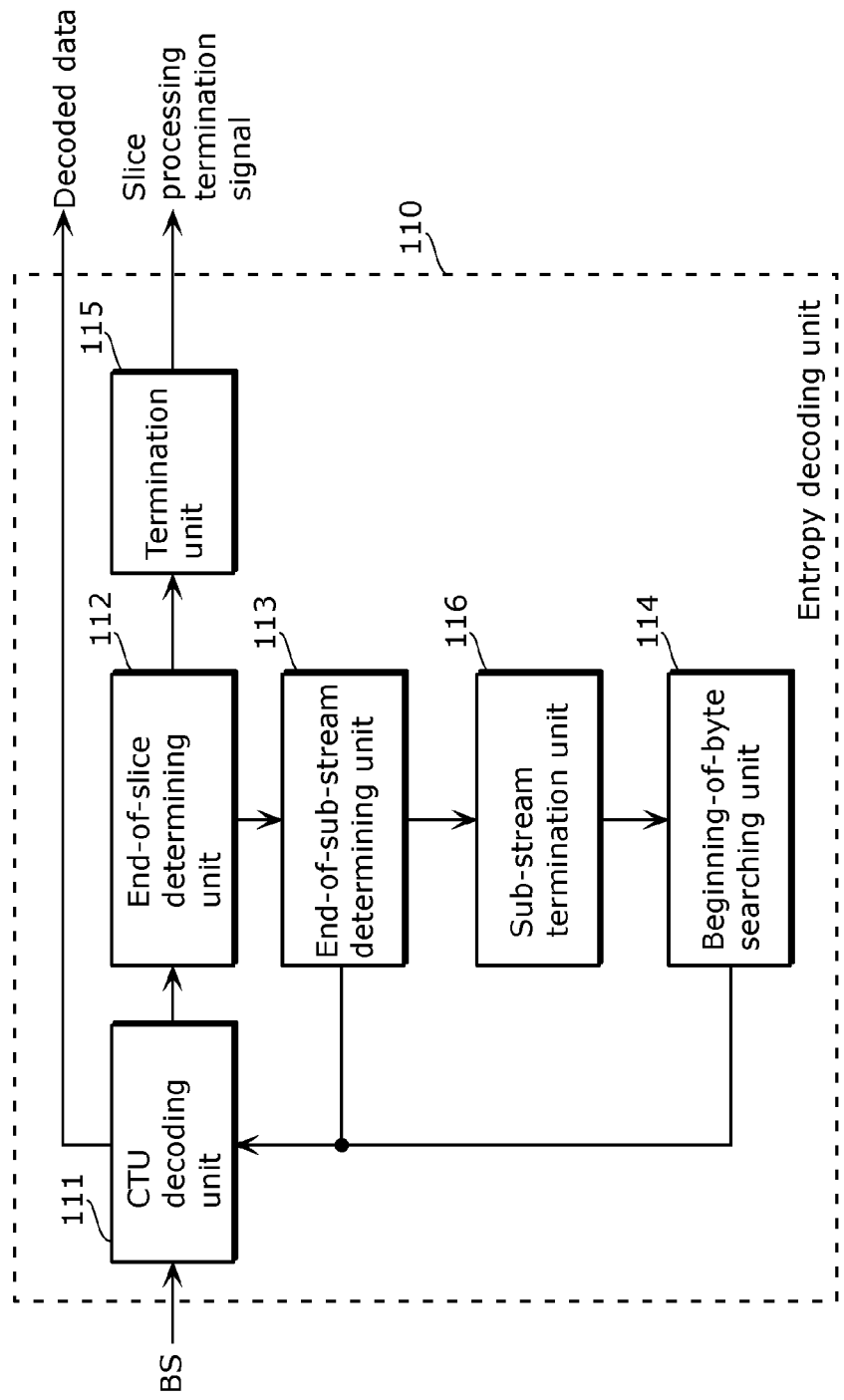
FIG. 7 is a block diagram showing an example of a configuration of an entropy decoding unit according to Embodiment 1.

FIG. 7 is a block diagram showing an example of a configuration of the entropy decoding unit 110 according to Embodiment 1. The entropy decoding unit 110 according to Embodiment 1 includes a CTU decoding unit 111, an end-of-slice determining unit 112, an end-of-sub-stream determining unit 113, a sub-stream termination unit 116, a beginning-of-byte searching unit 114, and a termination unit 115. The entropy decoding unit 110 restores, from a bitstream BS, decoded data including, for example, quantized coefficients, and a slice processing termination signal.

Figure 8:
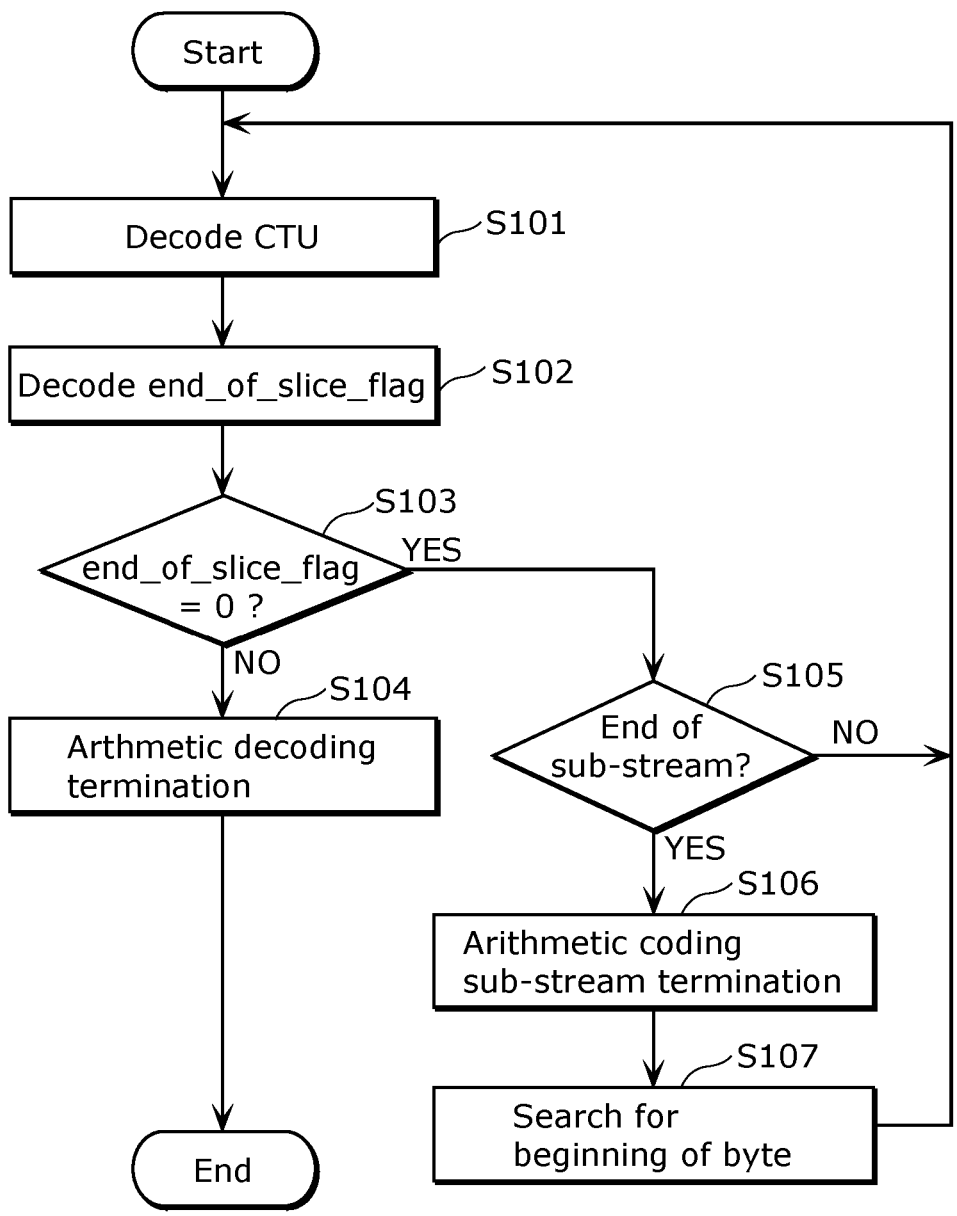
FIG. 8 is a flowchart of an example of processing performed by the entropy decoding unit according to Embodiment 1.

FIG. 8 is a flowchart of an example of processing performed by the entropy decoding unit 110 according to Embodiment 1.

First, the CTU decoding unit 111 performs arithmetic decoding on a CTU (coding_tree_unit( )) in a bitstream BS, according to a predetermined method (Step S101). Here, a CTU refers to a predetermined coding unit in a picture, and is, for example, a block including 16×16 pixels, 32×32 pixels, or 64×64 pixels. A coded CTU included in the bitstream BS is a set of information including, for example, information on a method of generating a prediction image (prediction signal) of the CTU and information on a signal (quantized coefficients) obtained by transforming and quantizing a prediction error signal that is a difference between the prediction signal and an original image.

Subsequently, the end-of-slice determining unit 112 performs arithmetic decoding on an end-of-slice flag (end_of_slice_flag) indicating whether or not the CTU arithmetically decoded in Step S101 is at the end of a slice (Step S102). For example, slices are regions obtained by dividing a picture at dividing points provided in raster scan order when the picture is processed on a per-CTU basis. Furthermore, when the end-of-slice flag indicates 1, it indicates that the CTU corresponding to the flag, that is, the CTU which was arithmetically decoded immediately before is at the end of a slice. When the end-of-slice flag indicates 0, it indicates that the CTU is not at the end of a slice.

The end-of-slice determining unit 112 then determines whether or not the end-of-slice flag (end_of_slice_flag) indicates 0 (Step S103). Here, when it is determined that the end-of-slice flag indicates 1 but not 0, that is, the CTU is at the end of a slice (No in Step S103), the termination unit 115 performs arithmetic decoding termination (Step S104). The arithmetic decoding termination refers to processing in which a bitstream pointer is adjusted to allow decoding of a next signal in the bitstream BS without renormalization of the internal probability state of arithmetic decoding. In the termination, for example, seven bits may be further read from the bitstream BS. Furthermore, the termination unit 115 outputs a signal indicating that the CTU is at the end of a slice (slice processing termination signal). For example, the slice processing termination signal is used for notifying execution of processing of a next slice.

On the other hand, when it is determined that the end-of-slice flag indicates 0 (Yes in Step S103), that is, when the CTU which was arithmetically decoded immediately before is not at the end of a slice, the end-of-sub-stream determining unit 113 determines whether or not the CTU is at the end of a sub-stream (Step S105).

The sub-stream refers to, for example, a processing unit such as a tile or a CTU line. Tiles are blocks obtained by dividing a picture vertically and/or horizontally. One tile including one or more CTUs. Furthermore, since coding/decoding can start from the beginning of a tile, the tiles are structural units that can be used in parallel processing. Furthermore, CTU lines are structural units obtained by dividing a slice or a picture into lines. In the method referred to as WPP where processing starts from the left end of a picture, the context information (probability information) of the end of the CTU located at the top-right of a current CTU to be arithmetically coded or arithmetically decoded is used as the initial probability of the current CTU. In the WPP, arithmetic coding or arithmetic decoding of the current CTU can start when processing of the CTU from which the initial probability is obtained is completed. Hence, a plurality of CTU lines can be processed in parallel (detailed processing may be similar to that in NPL 1).

Here, for example, when the sub-stream is a tile, the end-of-sub-stream determining unit 113 compares, in Step S105, the tile ID of the CTU which was arithmetically decoded immediately before with the tile ID of a next CTU, to determine whether or not they are different. Accordingly, it is determined whether or not the CTU which was arithmetically decoded immediately before is at the end of a tile (See FIG. 9 that will be described later). The tile ID refers to internal information for distinguishing which tile the CTU belongs to. More specifically, when the two tile IDs are different, the end-of-sub-stream determining unit 113 determines that the CTU which was arithmetically decoded immediately before is at the end of a sub-stream. Furthermore, when the sub-stream is a CTU line, the end-of-sub-stream determining unit 113 determines, in Step S105, whether or not a CTU next to the CTU which was arithmetically decoded immediately before is at the left end of a picture. In the case where a picture is divided into tiles, it is determined whether or not the next CTU is at the left end of a tile. Accordingly, it is determined whether or not the CTU which was arithmetically decoded immediately before is at the end of a CTU line (See FIG. 9 that will be described later). More specifically, when the next CTU is at the left end of a picture (or a tile), the end-of-sub-stream determining unit 113 determines that the CTU which was arithmetically decoded immediately before is at the end of a CTU line.

When it is determined in Step S105 that the CTU is at the end of a sub-stream (Yes in Step S105), the sub-stream termination unit 116 performs arithmetic decoding on 1-bit indicating the end of a sub-stream (sub-last bit), and performs sub-stream termination of arithmetic decoding (arithmetic decoding sub-stream termination) (Step S106). Arithmetic decoding of the sub-last bit always restores a value of 1. In other words, a sub-last bit indicating a value of 1 is arithmetically coded in advance and included in a bitstream BS such that the sub-last bit is positioned after the CTU which is at the end of a sub-stream. Furthermore, the arithmetic decoding sub-stream termination is processing similar to arithmetic decoding termination performed by the termination unit 115 in Step S104.

After the arithmetic decoding sub-stream termination is performed, the beginning-of-byte searching unit 114 performs beginning-of-byte search which is processing for searching for the beginning of a next byte unit and which is similar to Step S806 in FIG. 2 (Step S107). More specifically, since processing can be started from the beginning of byte units, the beginning-of-byte searching unit 114 searches for the beginning of a next byte unit, and moves a bitstream pointer to the beginning point. The beginning point of the byte unit searched for is the beginning point of a next sub-stream. After it is determined in Step S105 that the CTU is not at the end of a sub-stream (No in Step S105), or after the beginning-of-byte search in Step S107, the entropy decoding unit 110 repeats the processing from Step S101 on a next CTU.

FIG. 9 is a diagram showing an example of slice syntax according to Embodiment 1.

The slice according to Embodiment 1 includes data 181 indicating a coded CTU (coding_tree_unit( )) and an arithmetically coded end-of-slice flag 182 (end_of_slice_flag) for determining the end of the slice. The slice also includes the arithmetically coded sub-last bit 184 (end_of_sub_stream_one_bit) and a predetermined bit string 185 (byte_alignment( )), when a condition 183 is satisfied.

In the slice according to Embodiment 1, the data 181, the end-of-slice flag 182, the condition 183, and the bit string 185 respectively have the structure similar to that of the data 851, the end-of-slice flag 852, the condition 853, and the bit string 854 in the slice shown in FIG. 3A. The slice according to Embodiment 1 is different from the slice shown in FIG. 3A in that the sub-last bit 184 (end_of_sub_stream_one_bit) on which arithmetic coding has been performed is included.

The condition 183 is a condition that the CTU indicated by the data 181 is at the end of a sub-stream. More specifically, the condition 183 is a first condition that the CTU is not at the end of a slice but at the end of a tile, or a second condition that the CTU is not at the end of a slice but at the end of a CTU line.

More specifically, the first condition is a condition that the end-of-slice flag (end_of_slice_flag) indicates 0, tiles_enabled_flag is true, and TileID[x] and TileID[x−1] are different. When tiles_endabled_flag is true, the tiles_enabled_flag indicates that the sub-stream is a tile. TileID[x] indicates the tile ID of a CTU next to the CTU indicated by the data 181. TileID[x−1] indicates the tile ID of the CTU indicated by the data 181.

The second condition is a condition that the end-of-slice flag (end_of_slice_flag) indicates 0, entropy_coding_sync_enabled_flag is true, and the CTU next to the CTU indicated by the data 181 is at the left end of a picture. When entropy_coding_sync_enabled_flag is true, the entropy_coding_sync_enabled_flag indicates that the sub-stream is a CTU line. When the next CTU is at the left end of a picture, and when the address of the CTU next to the CTU indicated by the data 181 is divided by the horizontal width of the picture, the remainder is 0. The CTB (Ctb) in the condition 183 is used in the same meaning as CTU.

The entropy decoding unit 110 performs arithmetic decoding on the data 181 (coding_tree_unit( )) and the end-of-slice flag 182 (end_of_slice_flag). Subsequently, the entropy decoding unit 110 determines whether or not the condition 183 is satisfied. When the entropy decoding unit 110 determines that the condition 183 is satisfied, the entropy decoding unit 110 obtains (restores) a value of 1, by performing arithmetic decoding on the sub-last bit 184 (end_of_sub_stream_one_bit). Upon obtainment of the value of 1, the entropy decoding unit 110 performs arithmetic decoding sub-stream termination, and performs beginning-of-byte search that is processing in which the bit string 185 is skipped. The arithmetically decoded sub-last bit 184 (end_of_sub_stream_one_bit) always indicates a value of 1. When the condition 183 is not satisfied, the sub-last bit 184 is not included in a slice.

In such a manner, in Embodiment 1, when the CTU which was arithmetically decoded immediately before is at the end of a sub-stream, arithmetic decoding sub-stream termination is performed which is the same processing as the termination performed when the CTU which was arithmetically decoded immediately before is at the end of a slice. Hence, the image decoding apparatus 100 is capable of starting arithmetic decoding of a CTU from the beginning of a next byte unit searched for in Step 107, that is, from a point other than the beginning in a bitstream BS. As a result, the image decoding apparatus 100 is capable of decoding a plurality of structural units in a bitstream BS both in serial and in parallel. The structural units may be slices or sub-streams.

As described above, in Embodiment 1, arithmetic decoding of a plurality of sub-streams can be performed in parallel. Hence, Embodiment 1 is useful when high-speed processing is necessary, such as when a real-time playback of moving pictures with high resolution is performed. Furthermore, in Embodiment 1, termination is performed, for example, by properly resetting the internal probability state of arithmetic decoding at the end of a sub-stream. Hence, even when arithmetic decoding is performed on a plurality of sub-streams in parallel, the internal probability state in decoding is always the same as that in coding, allowing proper decoding of the bitstream BS.

Furthermore, in Embodiment 1, when a CTU is at the end of a slice, arithmetic decoding of a sub-last bit and arithmetic decoding sub-stream termination are not performed. Accordingly, when the CTU is at the end of a slice, it is not necessary to include, in a bitstream BS, a sub-last bit that is a redundant code. As a result, it is possible to properly decode a bitstream BS coded with less decrease in efficiency and allowing parallel processing.

Furthermore, in Embodiment 1, processing, including arithmetic decoding of a sub-last bit and termination, is performed. Hence, common processing can be performed on the end of a sub-stream and on the end of a slice. More specifically, since an additional processing unit is not necessary for processing performed on the end of a sub-stream, images can be decoded with simple configuration. In other words, the configuration, in which arithmetic decoding termination is triggered when processing is performed on the end of a slice, that is, when a value of 1 is restored by performing arithmetic decoding of 1-bit, can be applied not only to the end of a slice, but also to the end of a sub-stream. With this, the same configuration can be used, simplifying the configuration for decoding images. More specifically, the sub-stream termination unit 116 is capable of using functions of the end-of-slice determining unit 112 and the termination unit 115.

(Variation)

In Embodiment 1, arithmetic decoding is performed on the sub-last bit 184, and the bit string 185 including the first bit indicating a value of 1 is skipped. In Variation of Embodiment 1, arithmetic decoding is performed on the first bit, as the sub-last bit 184. More specifically, in Variation of Embodiment 1, the sub-last bit 184 shown in FIG. 9 is omitted. Instead, the first bit of the bit string 185 is used as the sub-last bit. Variation of Embodiment 1 also produces advantageous effects similar to those in Embodiment 1.

FIG. 10 is a diagram showing an example of syntax of the bit string 185 according to Variation of Embodiment 1.

The bit string 185 according to Variation of Embodiment 1 includes a bit 185*a* having a value to be restored to a value of 1 by arithmetic decoding, and as many bits 185*b* which indicate values of 0 as are necessary and which are not to be arithmetically decoded. Specifically, the first bit 185*a* of the bit string 185 according to Variation of Embodiment 1 is not a bit indicating a value of 1 as in Embodiment 1, but a bit obtained by performing arithmetic coding on a value of 1.

In FIG. 10, f(1) in Descriptor indicates that arithmetic coding or arithmetic decoding is not performed on the data (bit) which is included in a bitstream and which is associated with f(1). More specifically, f(1) indicates that the value of data (bit) itself included in a bitstream is recognized as an original value of the data. For example, when a bit in a bitstream indicates "0", "0" is recognized as an original value of the bit. When a bit in a bitstream indicates "1", "1" is recognized as an original value of the bit. On the other hand, ae(v) indicates that arithmetic coding or arithmetic decoding is performed on the data (bit), associated with ae(v), in a bitstream. More specifically, ae(v) indicates that arithmetic coding or arithmetic decoding based on information indicating the above probability information or internal probability state is performed on data (bit) in a bitstream.

In Variation of Embodiment 1, it is possible to obtain advantageous effects similar to those in Embodiment 1, and to decrease the number of bits of data to be coded or decoded of each sub-stream by 1 bit, allowing an increase in coding efficiency.

In Embodiment 1 and Variation of Embodiment 1, arithmetic decoding sub-stream termination is performed when a value of 1 is restored by decoding 1-bit (sub-last bit). However, arithmetic decoding sub-stream termination may be performed when a different value is restored. For example, the value may be "0" or any other values as long as they are predetermined. Furthermore, arithmetic decoding may be performed on a flag indicating whether or not a CTU is at the end of a sub-stream (for example, end_of_sub_stream_flag) instead of on the sub-last bit. More specifically, when the end-of-slice flag (end_of_slice_flag) indicates 0, the entropy decoding unit 110 performs arithmetic decoding on an end-of-sub-stream flag (end_of_sub_stream_flag). When the entropy decoding unit 110 determines that the end-of-sub-stream flag indicates 1, the entropy decoding unit 110 performs arithmetic decoding termination similar to the termination performed when the end-of-slice flag indicates 1, and performs beginning-of-byte search (byte_alignment( )). When the entropy decoding unit 110 determines that the end-of-sub-stream flag indicates 0, the entropy decoding unit 110 continues arithmetic decoding on a next CTU.

Use of the end-of-sub-stream flag in such a manner also provides the advantageous effects similar to those in Embodiment 1 and Variation of Embodiment 1.

In Embodiment 1 and Variation of Embodiment 1, arithmetic decoding sub-stream termination is performed when the CTU which was arithmetically decoded immediately before is at the end of a sub-stream. In other words, in Embodiment 1 and Variation of Embodiment 1, arithmetic decoding sub-stream termination is performed when the CTU to be arithmetically decoded next to the CTU which was arithmetically decoded immediately before is at the beginning of a sub-stream. In addition, in Embodiment 1 and Variation of Embodiment 1, when the CTU which was arithmetically decoded immediately before is at the end of a slice, arithmetic decoding termination is performed. When the CTU is not at the end of a slice but at the end of a sub-stream, arithmetic decoding sub-stream termination is performed which is the same processing as the arithmetic decoding termination. Accordingly, it is possible to prevent arithmetic decoding termination from being redundantly performed, allowing proper arithmetic decoding.

Embodiment 2

Figure 11:
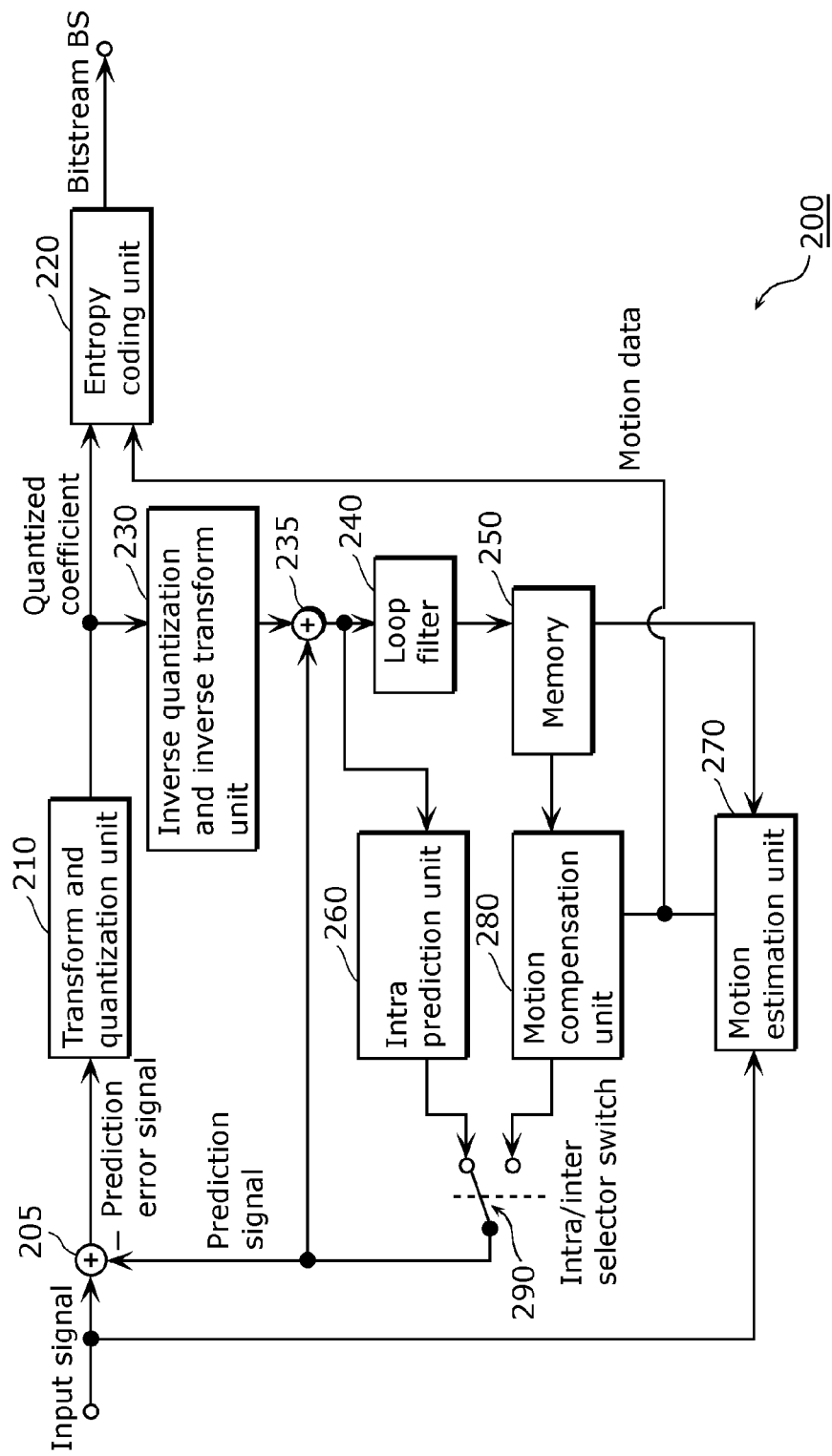
FIG. 11 is a block diagram showing an example of a configuration of an image coding apparatus according to Embodiment 2.

FIG. 11 is a block diagram showing an example of a configuration of an image decoding apparatus according to Embodiment 2.

An image coding apparatus 200 according to Embodiment 2 generates a bitstream BS to be decoded by the image decoding apparatus 100 according to Embodiment 1. The image coding apparatus 200 includes: a subtractor 205; a transform and quantization unit 210; an entropy coding unit 220; an inverse quantization and inverse transform unit 230; an adder 235; a loop filter 240; a memory 250; an intra prediction unit 260; a motion estimation unit 270; a motion compensation unit 280; and an intra/inter selector switch 290.

The subtractor 205 calculates a prediction error signal that is a difference between an input signal indicating a block included in image data and a prediction signal. The transform and quantization unit 210 transforms a prediction error signal in a spatial domain (frequency transform) to generate transform coefficients in a frequency domain. For example, the transform and quantization unit 210 performs discrete cosine transform (DCT) on the prediction error signal to generate transform coefficients. Furthermore, the transform and quantization unit 210 quantizes the transform coefficients to generate quantized coefficients.

The entropy coding unit 220 performs variable-length coding on the quantized coefficients to generate a bitstream BS. Furthermore, the entropy coding unit 220 performs variable-length coding on motion data (for example, motion vector) estimated by the motion estimation unit 270, and includes the data in the bitstream BS for output.

The inverse quantization and inverse transform unit 230 restores transform coefficients by performing inverse quantization on the quantized coefficients. The inverse quantization and inverse transform unit 230 further restores a prediction error signal by performing inverse transform on the restored transform coefficients. It is to be noted that the restored prediction error signal is not identical to the prediction error signal generated by the subtractor 205 because information is removed by quantization. In other words, the restored prediction error signal includes quantized errors.

The adder 235 generates a local decoded image by adding the restored prediction error signal and a prediction signal. The loop filter 240 applies loop filtering, such as deblocking filtering, to the generated local decoded image.

The memory 250 is a memory for storing reference images to be used for motion compensation. More specifically, the memory 250 stores the local decoded image to which loop filtering has been applied, as a reference image.

The intra prediction unit 260 generates a prediction signal (intra prediction signal) by performing intra prediction according to an intra prediction mode. More specifically, the intra prediction unit 260 performs intra prediction on a current block to be coded (input signal) by referring to images neighboring the current block in the local decoded image generated by the adder 235. Accordingly, the intra prediction unit 260 generates an intra prediction signal.

The motion estimation unit 270 estimates motion data (for example, motion vector) indicating motion between the input signal and a reference image stored in the memory 250. The motion compensation unit 280 performs motion compensation based on the estimated motion data to generate a prediction signal (inter prediction signal) of the current block.

The intra/inter selector switch 290 selects an intra-prediction signal or inter prediction signal, and outputs the selected signal to the subtractor 205 and the adder 235 as a prediction signal.

With the above configuration, the image coding apparatus 200 according to Embodiment 2 codes image data.

Here, the entropy coding unit 220 in the image coding apparatus 200 according to Embodiment 2 performs arithmetic coding on a current signal to be coded including quantized coefficients and motion data, that is, a current signal including CTUs to perform variable length-coding on the current signal.

According to arithmetic coding performed by the entropy coding unit 220 according to Embodiment 2, it is possible to generate a bitstream BS that is properly decodable both in parallel processing and serial processing. Hence, when sub-streams are used and high-speed processing is necessary in the HEVC, implementation of arithmetic coding according to Embodiment 2 is highly beneficial.

Hereinafter, a detailed description is given of arithmetic coding performed by the entropy coding unit 220. The arithmetic coding according to Embodiment 2 corresponds to the arithmetic decoding according to Embodiment 1.

Figure 12:
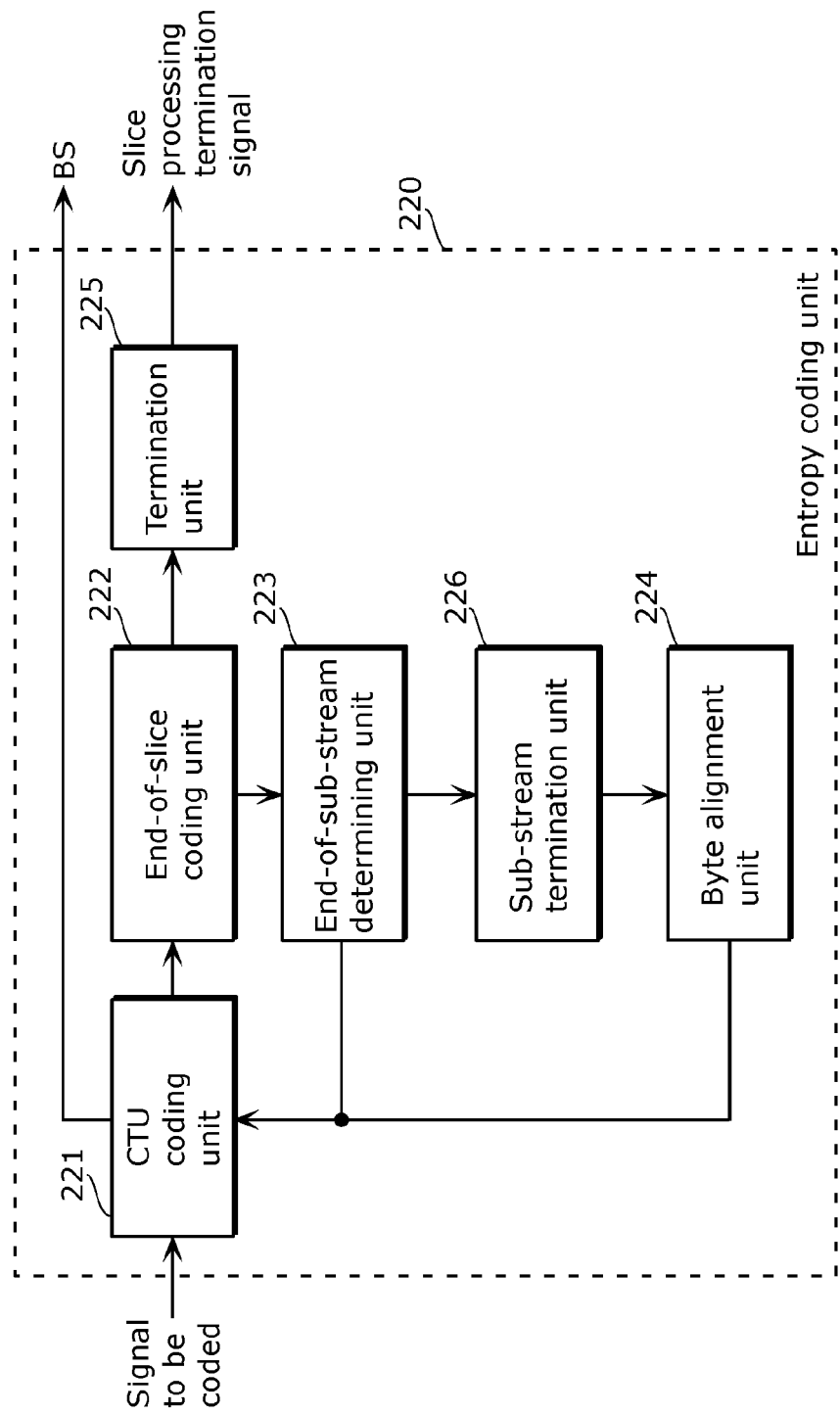
FIG. 12 is a block diagram showing an example of a configuration of an entropy coding unit according to Embodiment 2.

FIG. 12 is a block diagram showing an example of a configuration of the entropy coding unit 220 according to Embodiment 2. The entropy coding unit 220 according to Embodiment 2 includes: a CTU coding unit 221, an end-of-slice coding unit 222, an end-of-sub-stream determining unit 223, a sub-stream termination unit 226, a byte alignment unit 224, and a termination unit 225. The entropy coding unit 220 performs arithmetic coding on a current signal to output a bitstream BS. The entropy coding unit 220 also outputs a slice processing termination signal for notifying the end of slice processing, as necessary.

Figure 13:
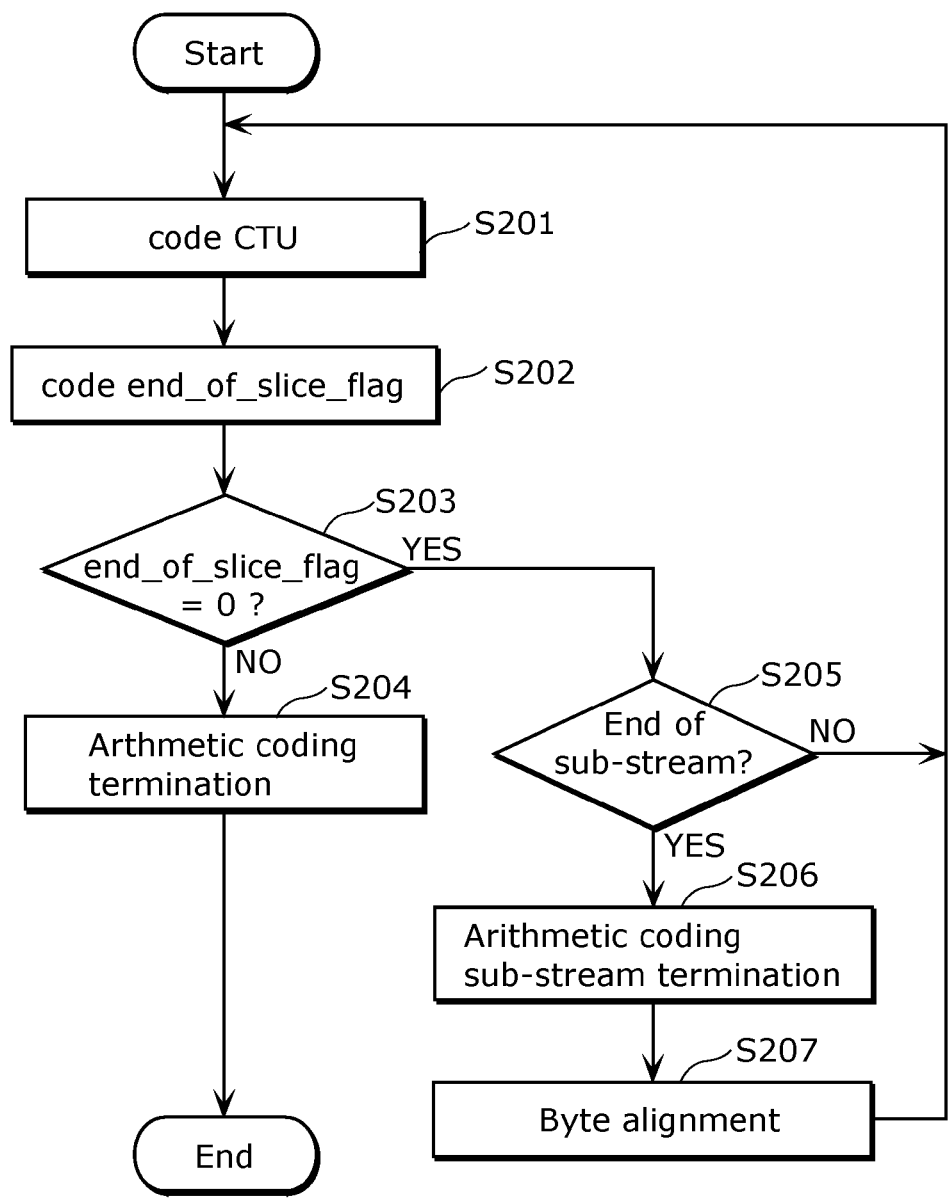
FIG. 13 is a flowchart of an example of processing performed by the entropy coding unit according to Embodiment 2.

FIG. 13 is a flowchart of an example of processing performed by the entropy coding unit 220 according to Embodiment 2.

First, the CTU coding unit 221 performs arithmetic coding on a CTU (coding_tree_unit( )) included in a current signal, based on a predetermined method (Step S201). The CTU coding unit 221 also inserts the CTU thus arithmetically coded into a bitstream BS before output. Alternatively, the CTU coding unit 221 stores the arithmetically coded CTU in a memory in the image coding apparatus 200, for example.

Subsequently, the end-of-slice coding unit 222 performs arithmetic coding on an end-of-slice flag (end_of_slice_flag) indicating whether or not the CTU arithmetically coded in Step S201 is at the end of a slice (Step S202). The end-of-slice coding unit 222 then determines whether or not the end-of-slice flag (end_of_slice_flag) indicates 0 (Step S203). Here, when it is determined that the end-of-slice flag indicates 1 but not 0, that is, the CTU is at the end of a slice (NO in Step S203), the termination unit 225 performs arithmetic coding termination (Step S204). The arithmetic coding termination is processing which is different from normal arithmetic coding and which is performed to reset the internal probability state of arithmetic coding. More specifically, in arithmetic coding, there are cases where, when a current binary signal is coded, a bit string is not output after updating the internal probability state. If the bit string is not output, information is lost. To prevent this, arithmetic coding termination is performed. Specifically, arithmetic coding termination includes EncoderFlush disclosed in NPL 1. With such arithmetic coding termination, the internal probability state is written to the bitstream BS, thereby generating the bitstream BS that is properly decodable. Furthermore, the termination unit 225 outputs a signal indicating that the CTU is at the end of a slice (slice processing termination signal). For example, the slice processing termination signal is used for notification of execution of processing of a next slice.

On the other hand, when it is determined that the end-of-slice flag indicates 0 (Yes in Step S203), that is, when the CTU which was arithmetically coded immediately before is not at the end of a slice, the end-of-sub-stream determining unit 223 determines whether or not the CTU is at the end of a sub-stream (Step S205). The sub-stream is the tile or CTU line described above. The end-of-sub-stream determining unit 223 determines whether or not the CTU is at the end of a sub-stream in the similar manner to that in Embodiment 1.

When it is determined that the CTU is at the end of a sub-stream (Yes in Step S205), the sub-stream termination unit 226 performs arithmetic coding on 1-bit indicating the end of a sub-stream (sub-last bit), and performs sub-stream termination of arithmetic coding (arithmetic coding sub-stream termination) (Step S206). Here, arithmetic coding is performed on the sub-last bit which always indicates a value of 1. More specifically, the sub-last bit which indicates a value of 1 is arithmetically coded in advance and is included in a bitstream BS so that the sub-last bit is positioned after the CTU that is at the end of a sub-stream. Furthermore, the arithmetic coding sub-stream termination is processing similar to arithmetic coding termination performed by the termination unit 225 in Step S204.

After the arithmetic coding sub-stream termination, the byte alignment unit 224 performs byte alignment which is processing of writing N bits (N is an integer that is greater than or equal to 0) so that the number of bits of a coded sub-stream is equal to an integral multiple of a byte unit (Step S207). More specifically, the byte alignment unit 224 writes N bits so that the beginning of the CTU to be arithmetically coded next is the beginning of a byte unit, and moves a bitstream pointer to the beginning point.

When it is determined that the CTU is not at the end of a sub-stream (No in Step S205) or after Step S207, the entropy coding unit 220 repeats processing from S201 on a next CTU.

The entropy coding unit 220 according to Embodiment 2 performs arithmetic coding on slices according to the syntax shown in FIG. 9.

More specifically, the entropy coding unit 220 generates data 181 (coding_tree_unit( )) which indicates the arithmetically coded CTU and an arithmetically coded end-of-slice flag 182 (end_of_slice_flag), and includes them into the bitstream BS. Subsequently, the entropy coding unit 220 determines whether or not a condition 183 is satisfied. When the entropy coding unit 220 determines that the condition 183 is satisfied, the entropy coding unit 220 performs arithmetic coding on the sub-last bit 184 (end_of_sub_stream_one_bit) indicating a value of 1, and includes the sub-last bit 184 in the bitstream BS. Upon performing of arithmetic coding of the sub-last bit 184, the entropy coding unit 220 performs arithmetic coding sub-stream termination, and performs byte alignment which is processing of writing the bit string 185. When the condition 183 is not satisfied, the entropy coding unit 220 does not perform arithmetic coding on the sub-last bit 184, and does not perform byte alignment, either. As a result, when the condition 183 is not satisfied, the arithmetically coded sub-last bit 184 and the bit string 185 are not included in a slice.

In such a manner, in Embodiment 2, when the CTU which was arithmetically coded immediately before is at the end of a sub-stream, arithmetic coding sub-stream termination is performed which is the same processing as the termination performed when the CTU which was arithmetically coded immediately before is at the end of a slice. Accordingly, the image coding apparatus 200 is capable of starting arithmetic coding of a CTU from the end of a bit string written in Step S207, that is, from a point other than the beginning in a current signal to be coded. As a result, the image coding apparatus 200 is capable of coding a plurality of structural unit included in an input signal to be coded, both in serial and parallel. The structural units may be slices or sub-streams.

As described, since arithmetic coding on a plurality of sub-streams can be performed in parallel in Embodiment 2, Embodiment 2 is useful when high-speed processing is necessary, such as when high-resolution moving pictures are recorded in real time. Furthermore, according to Embodiment 2, termination is performed by, for example, properly resetting the internal probability state of arithmetic coding. Hence, even when arithmetic coding is performed on a plurality of sub-streams in parallel, the internal probability state in coding is the same as that in decoding, allowing proper generation of a bitstream BS.

Furthermore, in Embodiment 2, when a CTU is at the end of a slice, arithmetic coding of a sub-last bit and arithmetic coding sub-stream termination are not performed. Accordingly, when the CTU is at the end of a slice, it is not necessary to include a sub-last bit that is a redundant code, in a bitstream BS. As a result, it is possible to perform parallel processing while preventing decrease in coding efficiency.

Furthermore, in Embodiment 2, processing, including arithmetic coding of a sub-last bit and termination, is performed on the end of a sub-stream. Hence, common processing can be performed on the end of a sub-stream and on the end of a slice. More specifically, since an additional processing unit is not necessary for processing performed on the end of a sub-stream, images can be decoded with simple configuration. In other words, the configuration, in which arithmetic coding termination is triggered when processing is performed on the end of a slice, that is, when a value of 1 is restored by arithmetic coding of 1-bit, can be applied only to the end of a slice, but also to the end of a sub-stream. With this, the same configuration can be used, simplifying the configuration for coding images. More specifically, the sub-stream termination unit 226 is capable of using functions of the end-of-slice coding unit 222 and the termination unit 225.

Variation of Embodiment 2

In Embodiment 2, arithmetic coding is performed on the sub-last bit 184, and the bit string 185 including the first bit indicating a value of 1 is skipped. In Variation of Embodiment 2, arithmetic coding is performed on the first bit, as the sub-last bit 184. More specifically, in Variation of Embodiment 2, the sub-last bit 184 shown in FIG. 9 is omitted. Instead, the first bit 185a of the bit string 185 (see FIG. 10) is used as the sub-last bit. Such Variation of Embodiment 2 also produces advantageous effects similar to those in Embodiment 2. Variation of Embodiment 2 is an image coding method which corresponds to the image decoding method according to Variation of Embodiment 1.

As shown in FIG. 10, the entropy coding unit 220 according to Variation of Embodiment 2 writes a bit string 185 into a bitstream BS. The bit string 185 includes a bit 185a generated by performing arithmetic coding on a bit indicating a value of 1, and as many bits 185b which indicate values of 0 as are necessary and which are not to be arithmetically coded. Specifically, the first bit 185a of the bit string 185 according to Variation of Embodiment 2 is not a bit indicating a value of 1 as in Embodiment 1, but a bit obtained by performing arithmetic coding on a value of 1.

In Variation of Embodiment 2, it is possible to obtain advantageous effects similar to those in Embodiment 1, and to decrease the number of bits of data to be coded or decoded of each sub-stream by 1 bit, allowing an increase in coding efficiency.

In Embodiment 1 and its Variation, when 1-bit indicating a value of 1 (sub-last bit) is coded, arithmetic coding sub-stream termination is performed; however, it may be that the arithmetic coding sub-stream termination is performed when performing arithmetic coding on a bit indicating another value. For example, the value may be "0", or any other values as long as it is predetermined. Furthermore, instead of the sub-last bit, arithmetic coding may be performed on a flag which indicates whether or not the CTU is at the end of a sub-stream (for example, end_of_sub_stream_flag). More specifically, when the end-of-slice flag (end_of_slice_flag) indicates 0, the entropy coding unit 220 performs arithmetic coding on the end-of-sub-stream flag (end_of_sub_stream_flag). Subsequently, when the entropy coding unit 220 determines that the end-of-sub-stream flag indicates 1, the entropy coding unit 220 performs arithmetic coding termination that is similar to the termination performed when the end-of-slice flag indicates 1, and also performs byte alignment (byte_alignment( )). When the entropy coding unit 220 determines that the end-of-substream flag indicates 0, the entropy coding unit 220 continues arithmetic coding on a next CTU. Use of the end-of-sub-stream flag in such a manner also provides the advantageous effects similar to those in Embodiment 2 and its Variation.

In Embodiment 2 and its Variation, arithmetic coding sub-stream termination is performed when the CTU which was arithmetically coded immediately before is at the end of a sub-stream. In other words, in Embodiment 2 and its Variation, arithmetic coding sub-stream termination is performed when the CTU that is to be arithmetically coded next to the CTU which was arithmetically coded immediately before is at the beginning of a sub-stream. In addition, in Embodiment 2 and its Variation, when the CTU which was arithmetically coded immediately before is at the end of a slice, arithmetic decoding termination is performed. When the CTU is at the end of a sub-stream but not at the end of a slice, arithmetic coding sub-stream termination is performed which is the same processing as the arithmetic coding termination. As a result, it is possible to prevent arithmetic coding termination from being performed redundantly, allowing proper arithmetic coding.

Descriptions have been given of the image decoding method and the image coding method according to one or more embodiments, based on each of the above embodiments and variations thereof; however, the present disclosure is not limited to these embodiments and their variations. Various modifications to the above embodiments and their variations that can be conceived by those skilled in the art, and forms configured by combining constituent elements in different embodiments and their variations without departing from the teachings of the present disclosure may be included in the scope of one or more of the aspects.

Figure 14B:
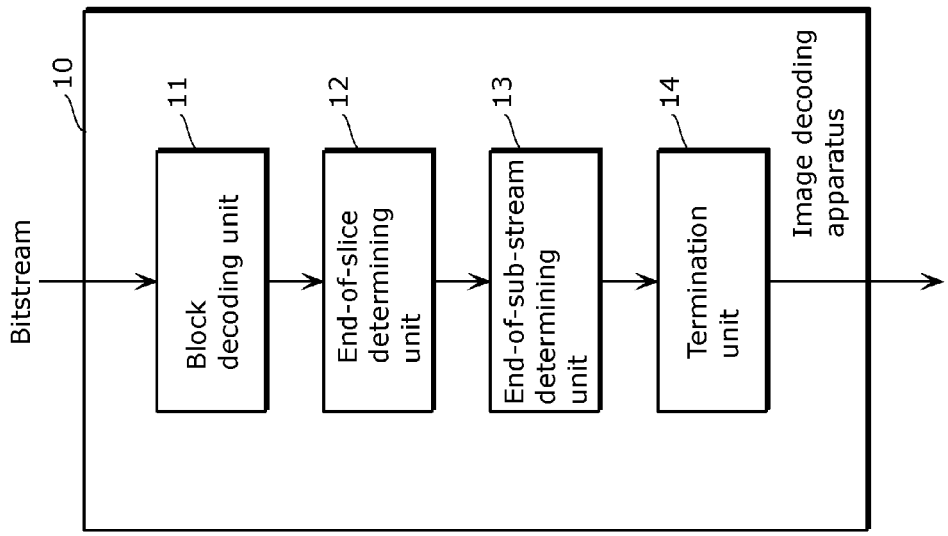
FIG. 14B is a diagram showing a configuration of an image decoding apparatus according to one embodiment of the present disclosure.
Figure 14A:
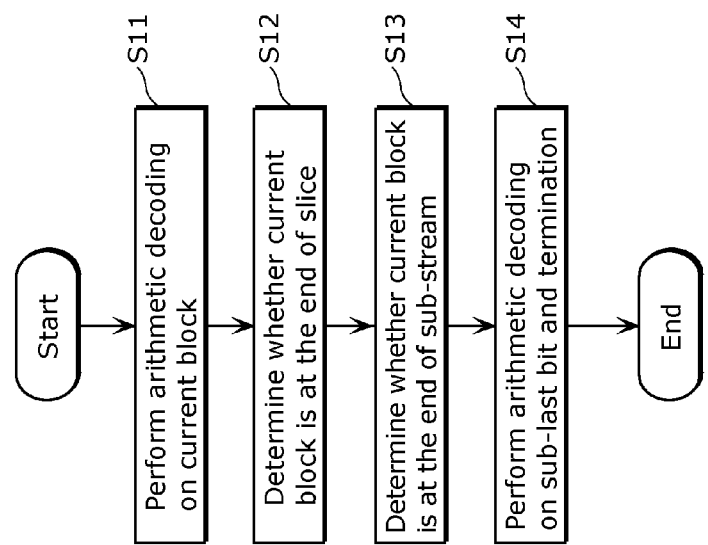
FIG. 14A is a flowchart of an image decoding method according to one embodiment of the present disclosure.

FIG. 14A is a flowchart of an image decoding method according to one embodiment of the present disclosure.

An image decoding method according to one embodiment is an image decoding method of decoding, on a per-block basis, a coded image included in a bitstream. The image decoding method includes: performing arithmetic decoding on a current block to be decoded (S11), determining whether or not the current block is at the end of a slice (S12), determining whether or not the current block is at the end of a sub-stream that is a structural unit of the image that is different from the slice, when it is determined that the current block is not at the end of the slice (S13), and performing arithmetic decoding on a sub-last bit and performing arithmetic decoding termination, when it is determined that the current block is at the end of the sub-stream (S14).

FIG. 14B is a diagram showing a configuration of an image decoding apparatus according to one embodiment of the present disclosure.

An image decoding apparatus 10 according to one embodiment is an image decoding apparatus which decodes, on a per-block basis, a coded image included in a bitstream. The image decoding apparatus 10 includes: a block decoding unit 11 which performs arithmetic decoding on a current block to be decoded; an end-of-slice determining unit 12 which determines whether or not the current block is at the end of a slice; an end-of-sub-stream determining unit 13 which determines, when it is determined that the current block is not at the end of the slice, whether or not the current block is at the end of a sub-stream that is a structural unit of the image that is different from the slice; and a termination unit 14 which performs arithmetic decoding on a sub-last bit and performs arithmetic decoding termination as first termination, when it is determined that the current block is at the end of the sub-stream.

With this, even if an arithmetically decoded block (CTU) is not at the end of a slice, if the block is at the end of a sub-stream (for example, tile or CTU line), arithmetic decoding termination is performed. As a result, it is possible to properly decode a plurality of sub-streams in a bitstream in parallel. Furthermore, it is possible to properly decode a bitstream coded with less decrease in efficiency, by using slices and sub-streams. Furthermore, processing, including arithmetic decoding of a sub-last bit and termination, is performed on the end of a sub-stream. Hence, when processing, including arithmetic decoding of a flag and termination, is performed on the end of a slice, common processing can be performed on the end of a sub-stream and on the end of a slice. More specifically, since an additional processing unit is not necessary for processing performed on the end of a sub-stream, images can be decoded with simple configuration.

Figure 15B:
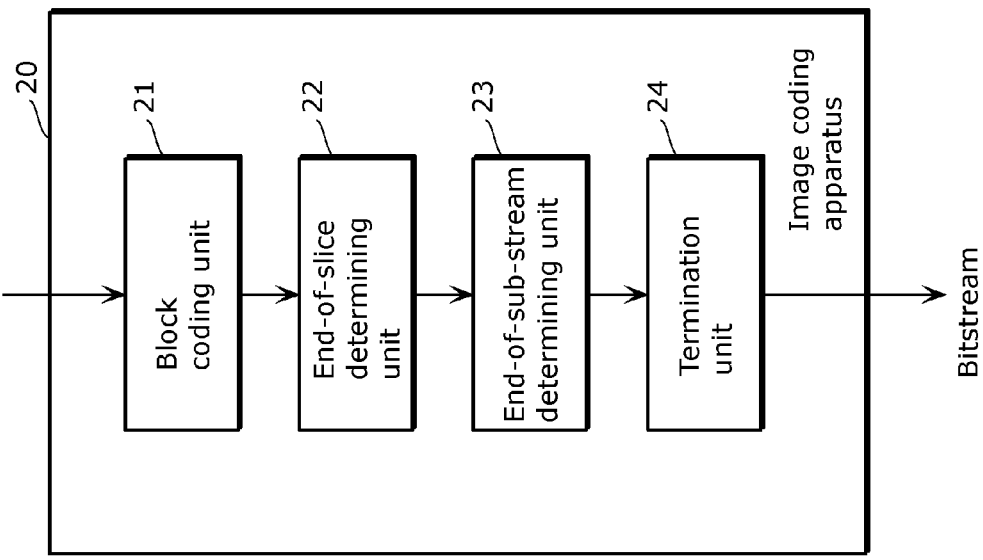
FIG. 15B is a diagram showing a configuration of an image coding apparatus according to one embodiment of the present disclosure.
Figure 15A:
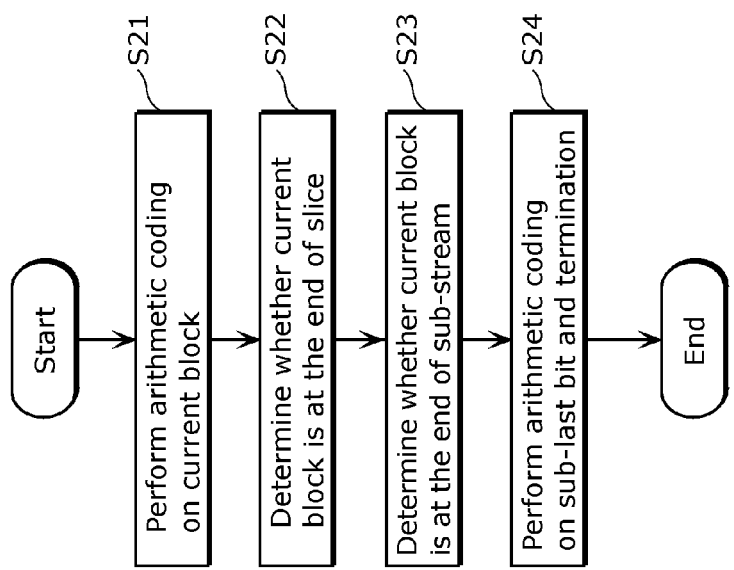
FIG. 15A is a flowchart of an image coding method according to one embodiment of the present disclosure.

FIG. 15A is a flowchart of an image coding method according to one embodiment of the present disclosure.

The image coding method according to one embodiment is an image coding method of coding an image on a per-block basis to generate a bitstream. The image coding method includes: performing arithmetic coding on a current block to be coded (S21); determining whether or not the current block is at an end of a slice (S22); determining, when it is determined that the current block is not at the end of the slice, whether or not the current block is at an end of a sub-stream which is a structural unit of the image that is different from the slice (S23); and performing arithmetic coding on a sub-last bit and arithmetic coding termination as first termination, when it is determined that the current block is at the end of the sub-stream (S24).

FIG. 15B is a diagram showing a configuration of an image coding apparatus according to one embodiment of the present disclosure.

An image coding apparatus 20 according to one embodiment is an image coding apparatus which codes an image on a per-block basis to generate a bitstream. The image coding apparatus 20 includes: a block coding unit 21 which performs arithmetic coding on a current block to be coded; an end-of-slice determining unit 22 which determines whether or not the current block is at the end of a slice; an end-of-sub-stream determining unit 23 which determines, when it is determined that the current block is not at the end of the slice, whether or not the current block is at the end of a sub-stream which is a structural unit of the image that is different from the slice; and a termination unit 24 which performs arithmetic coding on a sub-last bit and performs arithmetic coding termination as first termination, when it is determined that the current block is at the end of the sub-stream.

With this, even if an arithmetically coded block (CTU) is not at the end of a slice, but if the block is at the end of a sub-stream (for example, tile or CTU line), arithmetic coding termination is performed. This allows a plurality of sub-streams in a bitstream to be properly coded in parallel. Furthermore, it is possible to suppress a decrease in coding efficiency by using slices and sub-streams. Furthermore, processing, including arithmetic coding of a sub-last bit and termination, is performed on the end of a sub-stream. Hence, when processing, including arithmetic coding of a flag and termination is performed on the end of a slice, common processing can be performed on the end of a sub-stream and on the end of a slice. More specifically, since an additional processing unit is not necessary for processing performed on the end of a sub-stream, images can be coded with simple configuration.

In each embodiment above, each of the structural elements may be configured by a dedicated hardware, or may be implemented by executing a software program suitable for respective structural elements. Each of the structural elements may be implemented by a program executing unit, such as a CPU or a processor, reading a software program recorded on a hard disk or a recording medium such as a semiconductor memory, and executing the program. In other words, each of the image coding apparatus and the image decoding apparatus includes processing circuitry and storage electrically connected to the processing circuitry (storage accessible from the processing circuitry). The processing circuitry includes at least one of a dedicated hardware and a program executing unit. When the processing circuitry includes the program executing unit, the storage stores a software program executed by the program executing unit. Here, a software for implementing the image decoding apparatus, an image coding apparatus and others according to each embodiment above is a program causing a computer to execute each step included in the image decoding method shown in FIG. 14A or in the image coding method shown in FIG. 15A.

Furthermore, in each of above embodiments and their variations, it may be that the structural elements not specifically described are similar to those described in NPL1.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications of the moving picture coding method (image coding method) and the moving picture decoding method (image decoding method) described in each of embodiments and systems using thereof will be described. The system has a feature of including an image coding and decoding apparatus that includes an image coding apparatus using the image coding method and an image decoding apparatus using the image decoding method. Other configurations in the system can be changed as appropriate depending on the cases.

Figure 16:
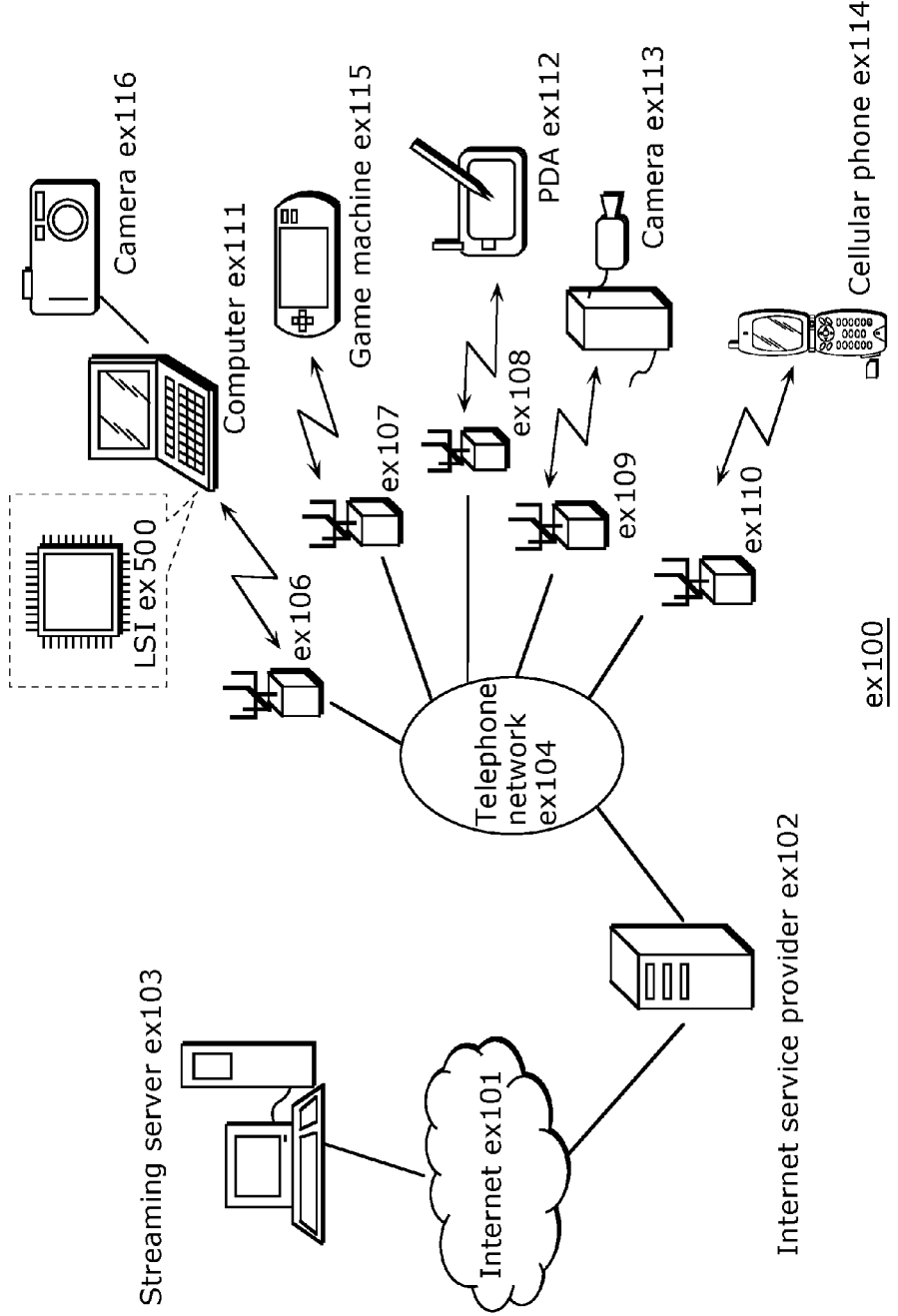
FIG. 16 is an overall configuration diagram of a content providing system that provides content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
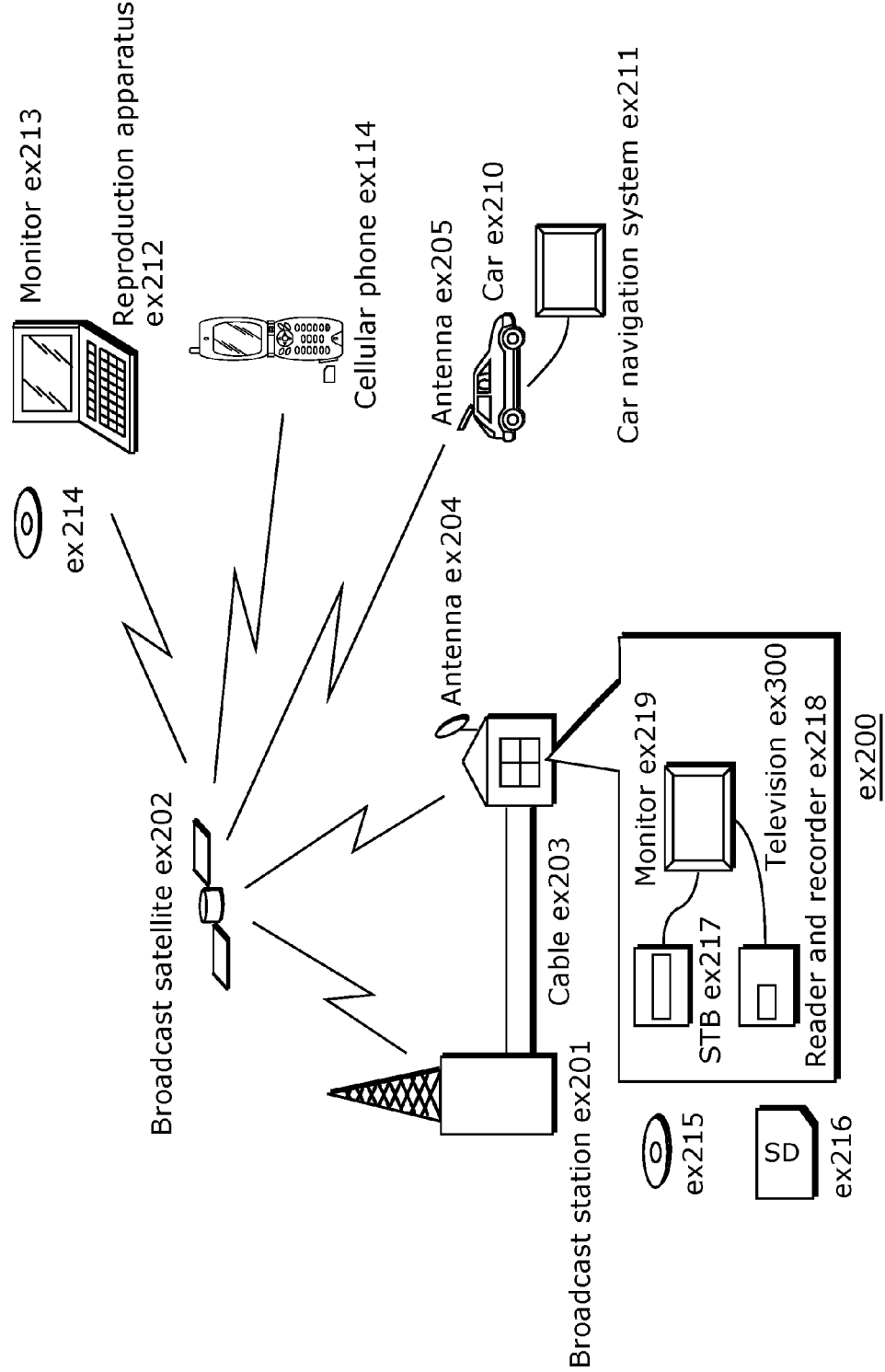
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
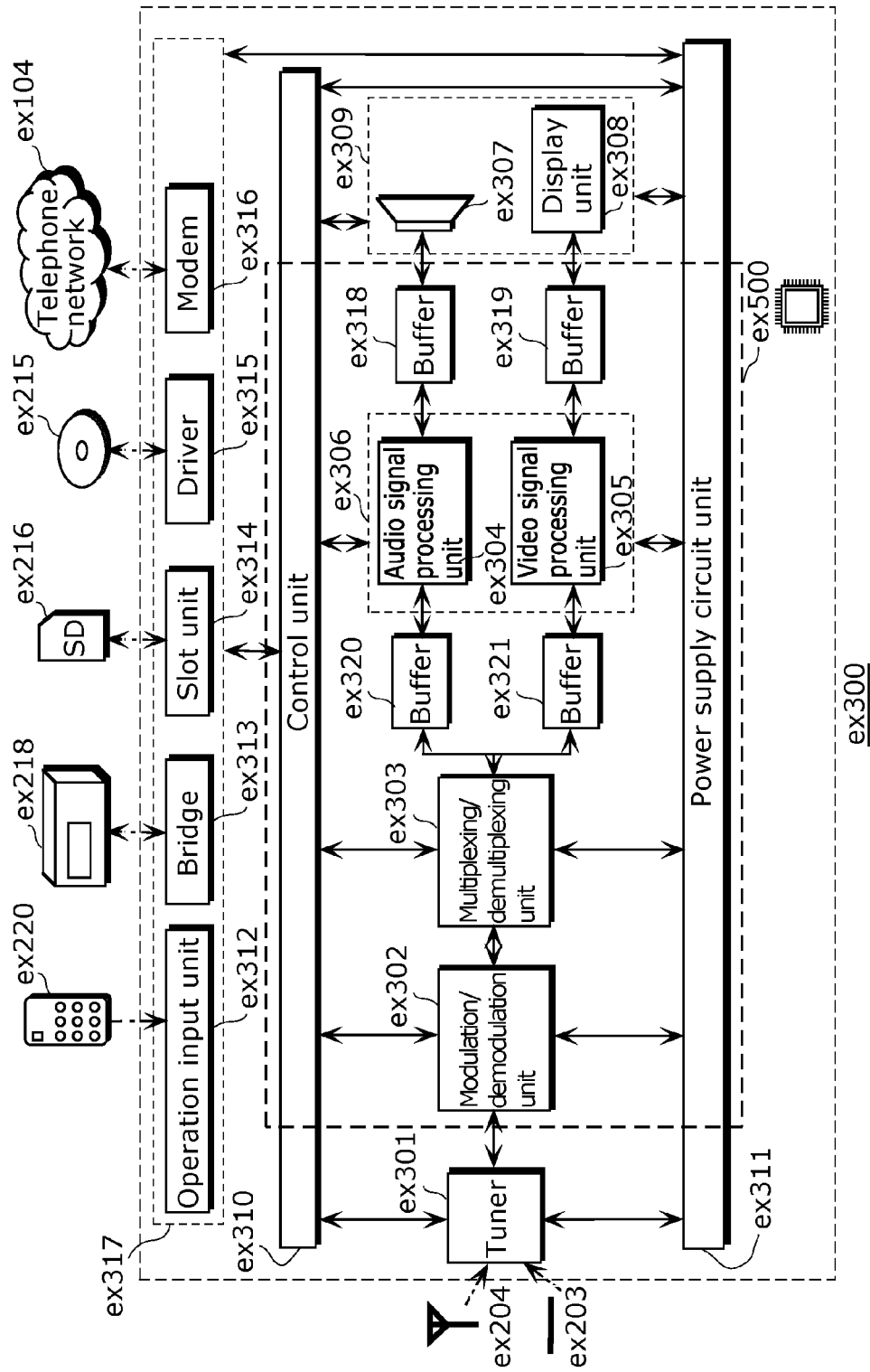
FIG. 18 shows a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 19:
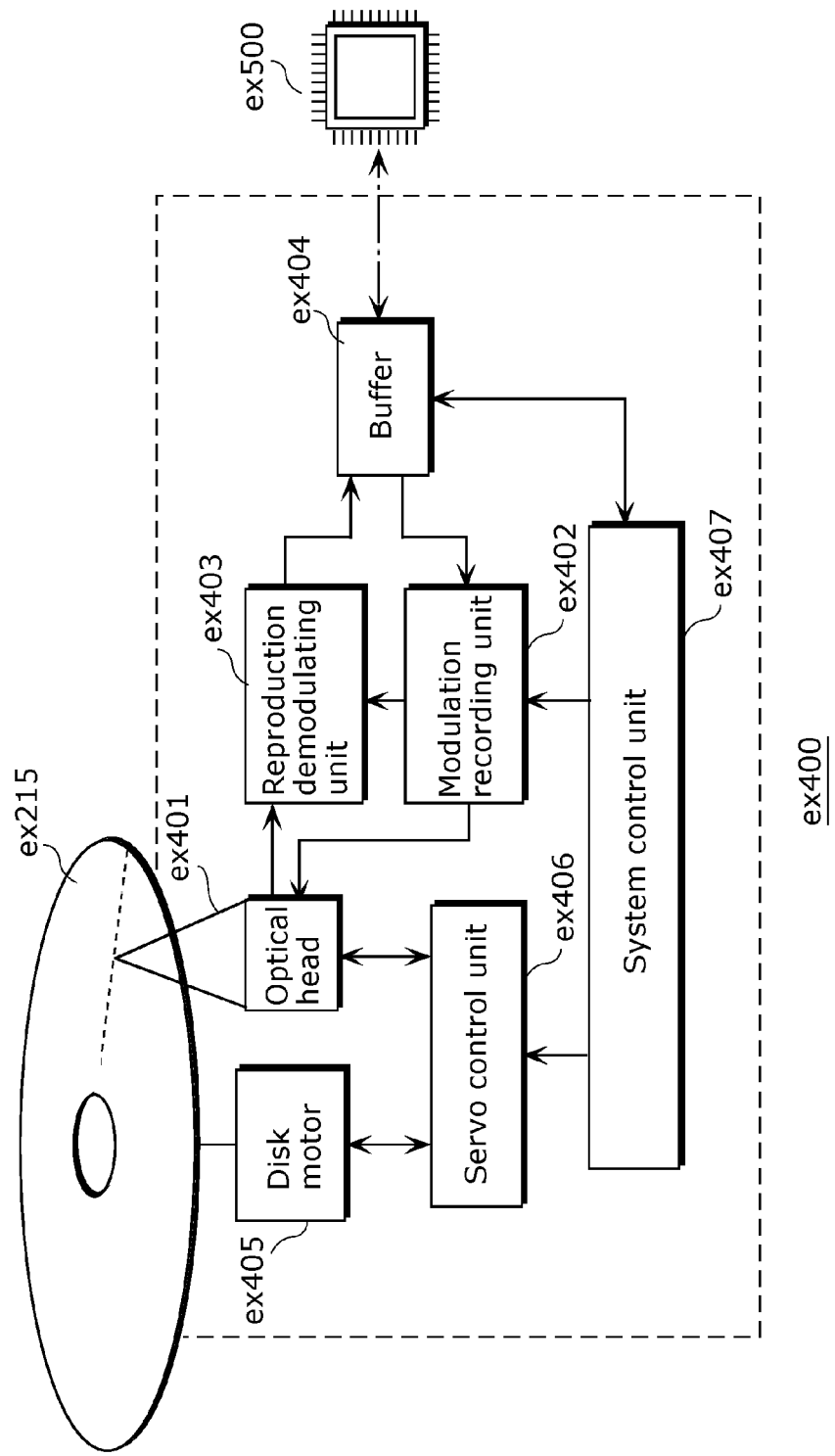
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
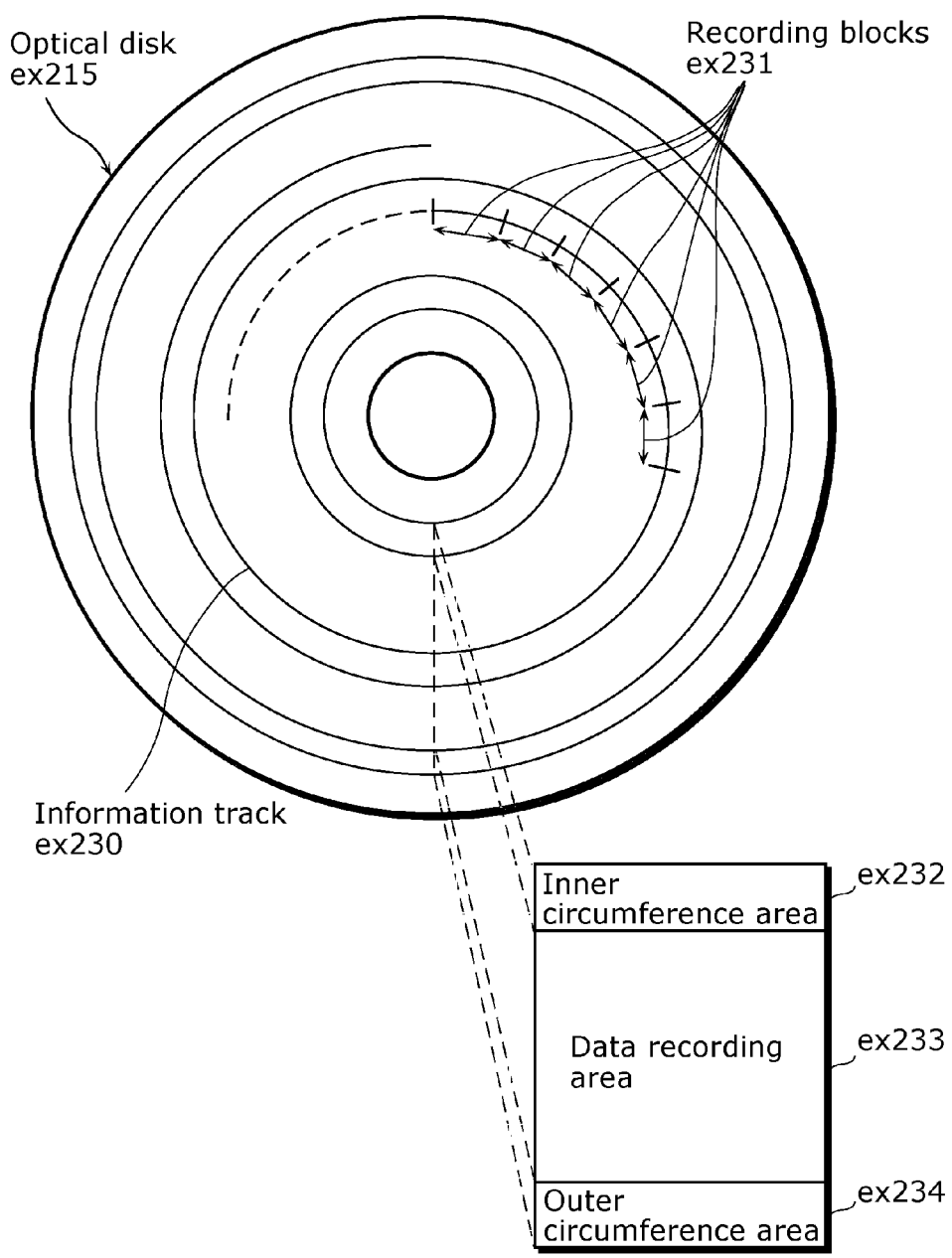
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
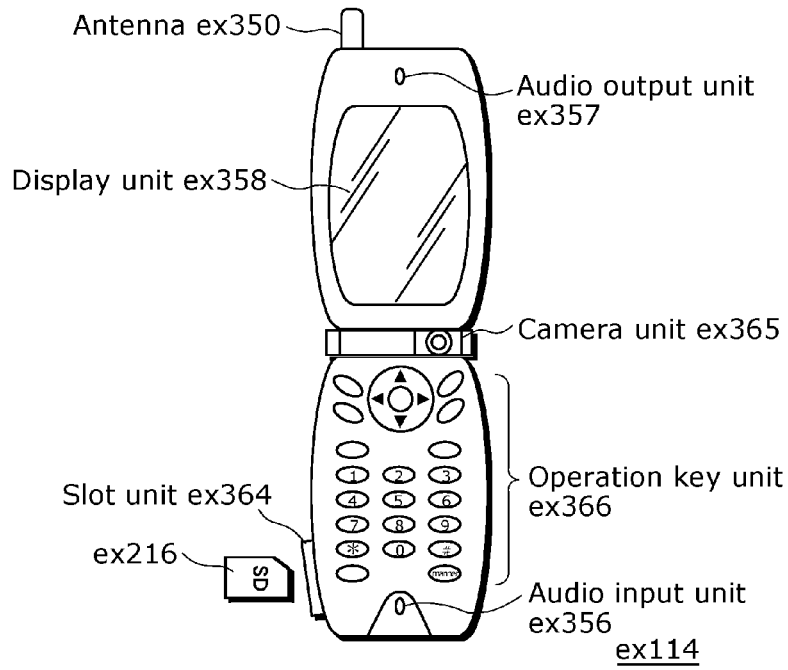
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 21B:
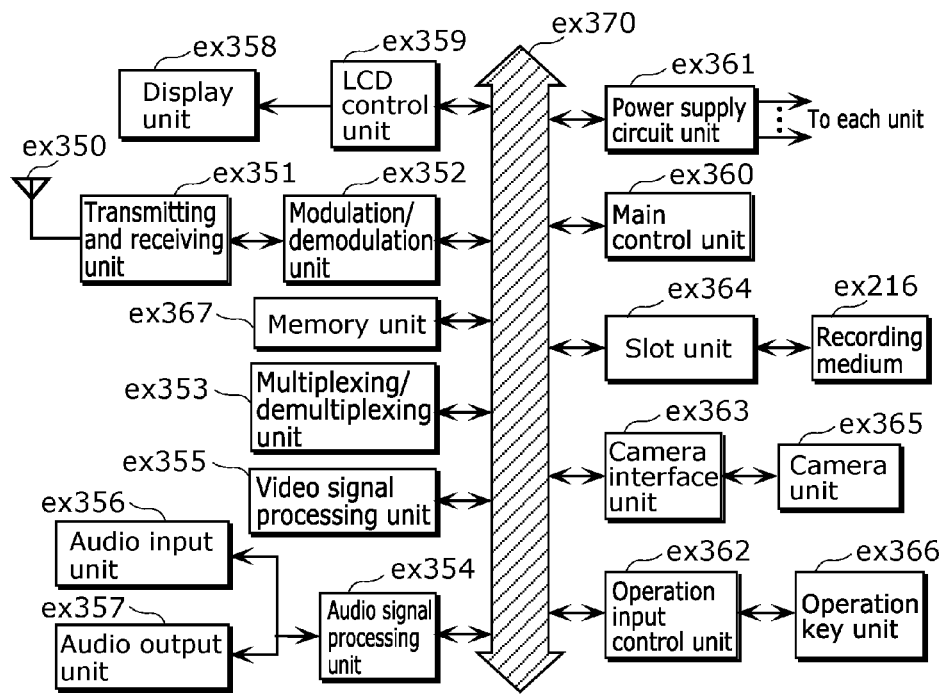
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
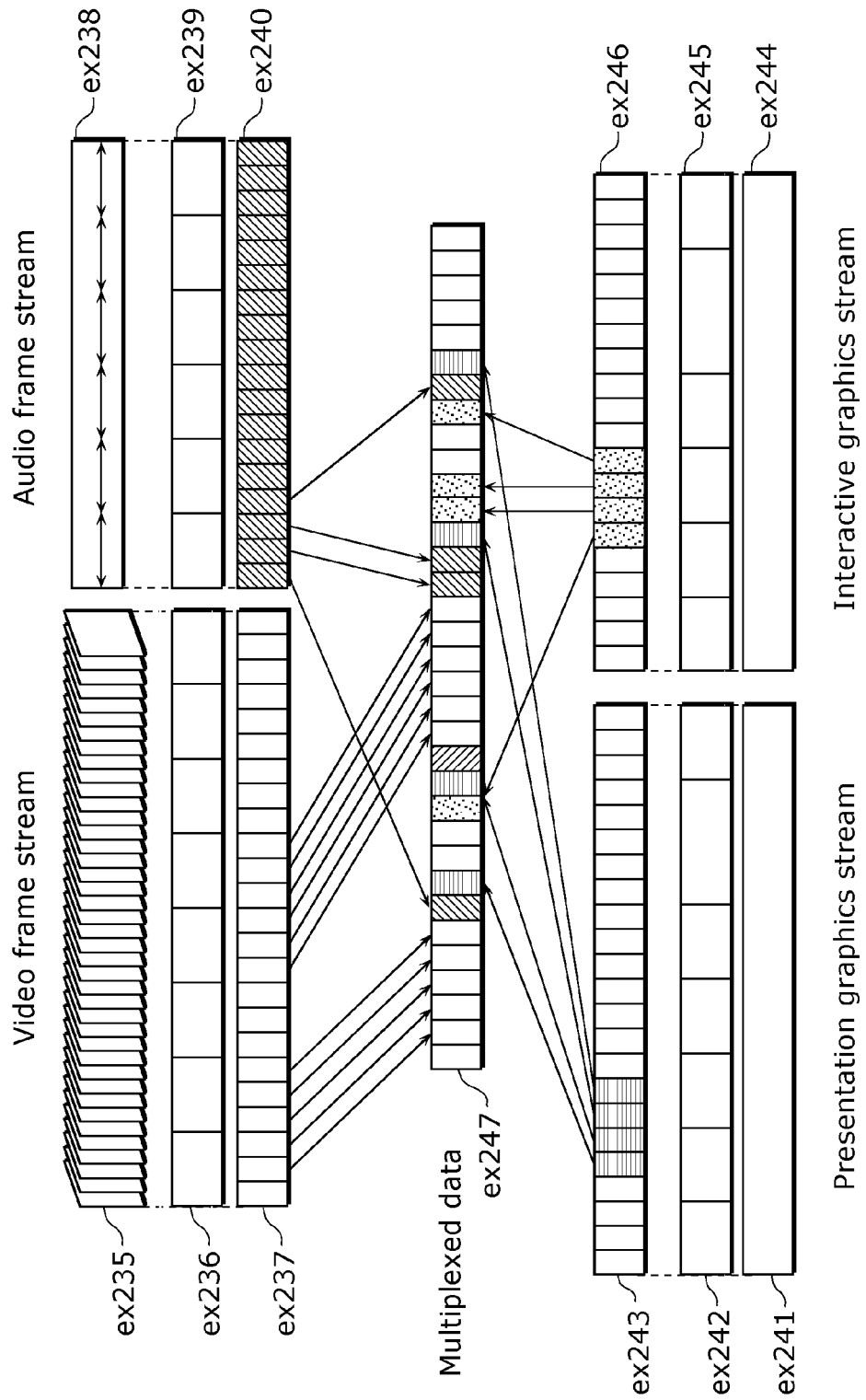
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
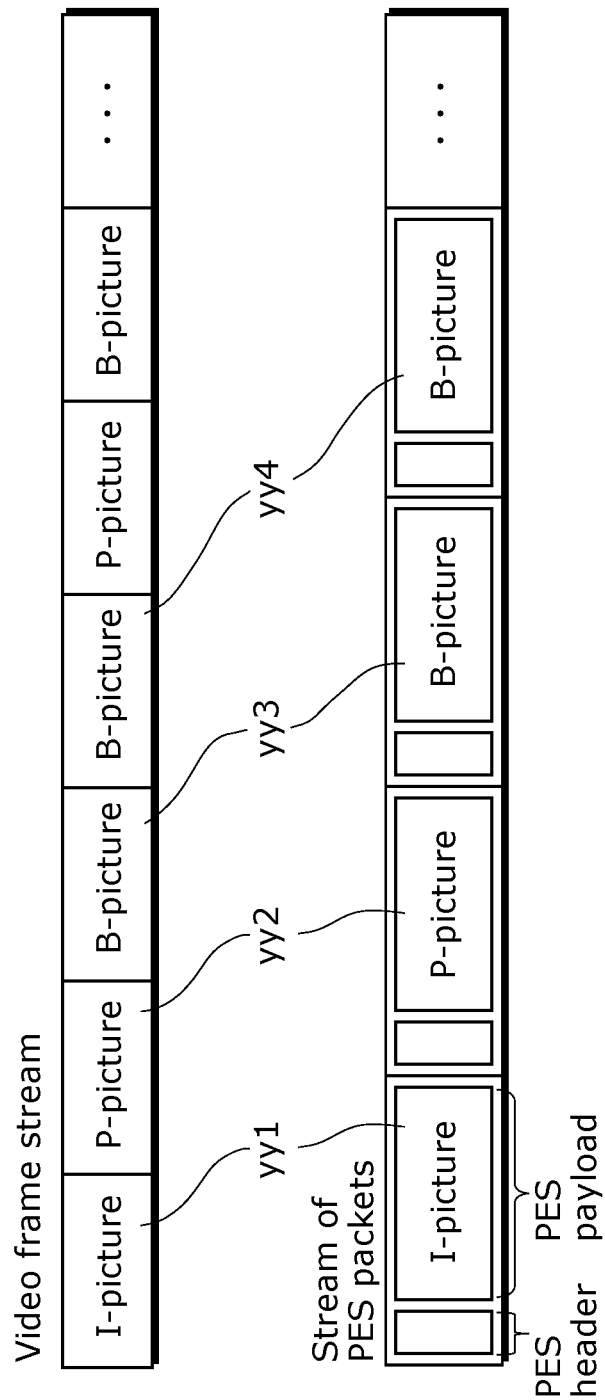
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
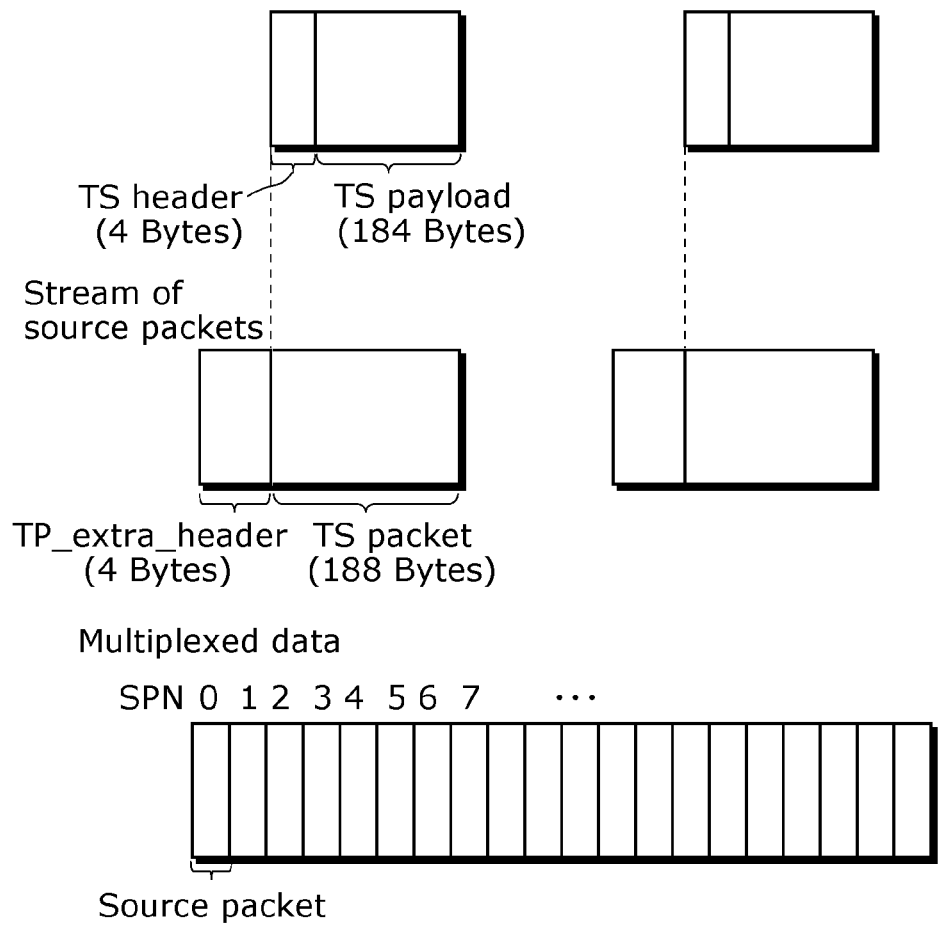
FIG. 25 shows a structure of TS packets and source packets in the multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
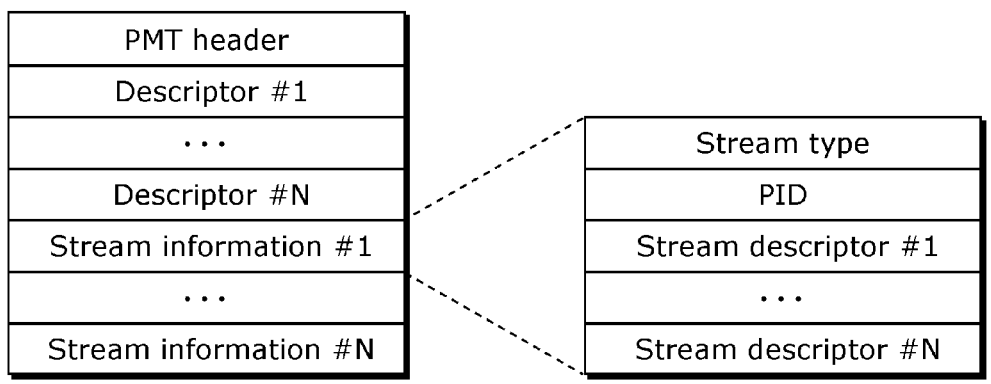
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data. The stream descriptors are equal in number to the number of streams in the multiplexed data.

When the multiplexed data is recorded on a recording medium and others, it is recorded together with multiplexed data information files.

Figure 27:
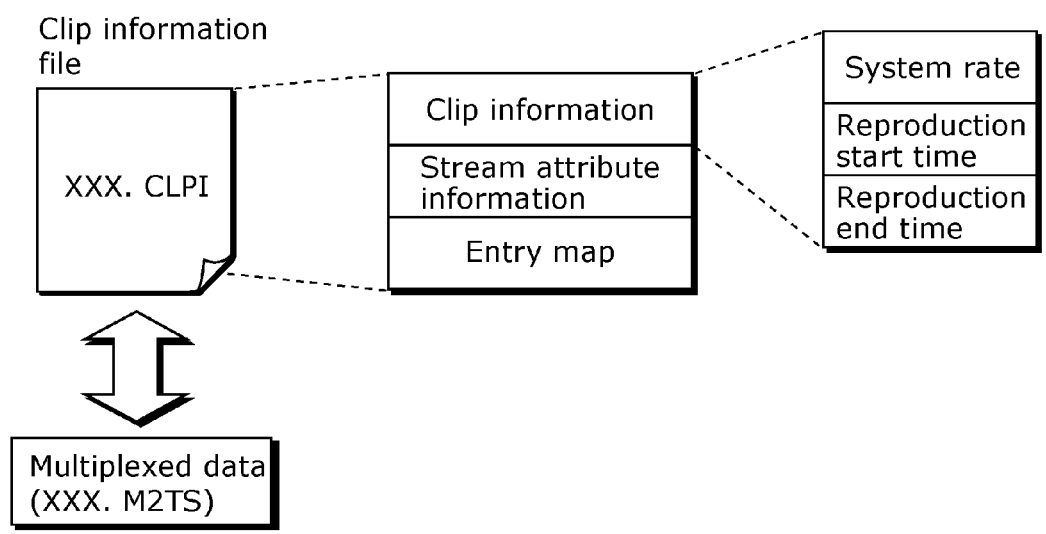
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
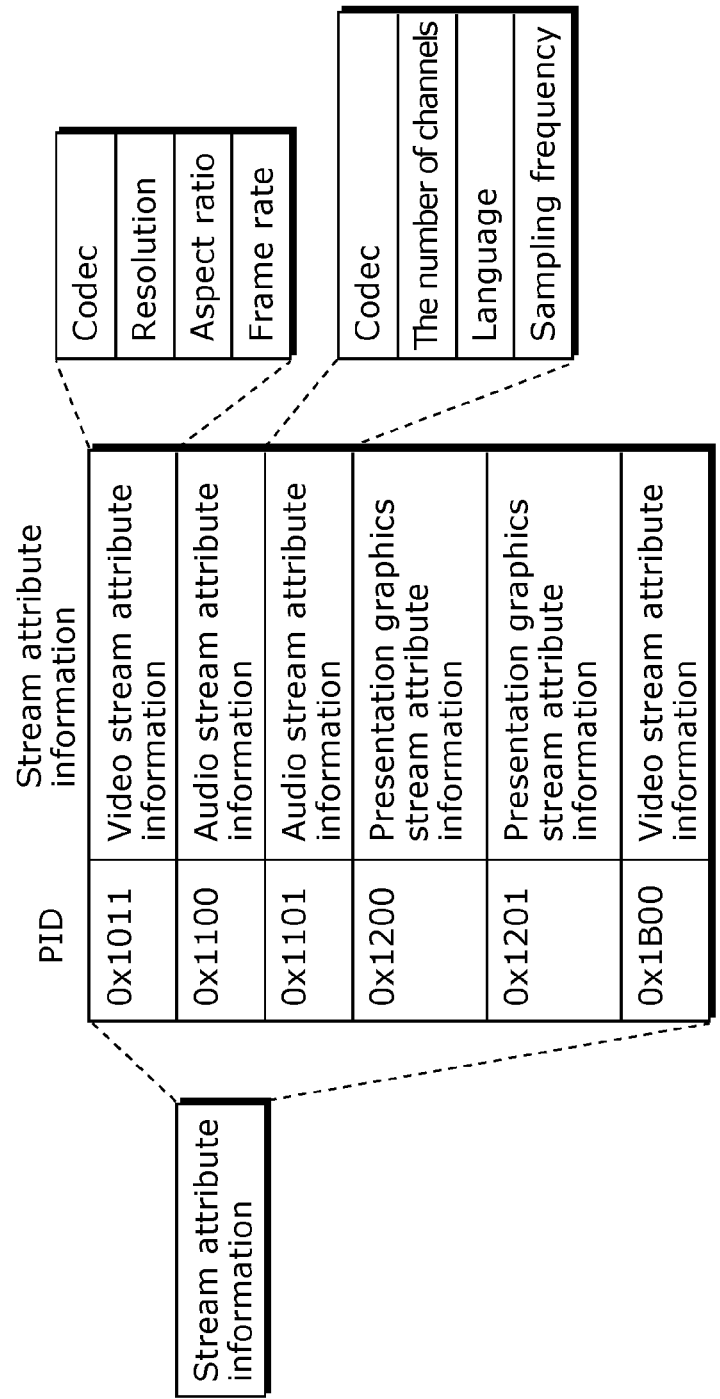
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
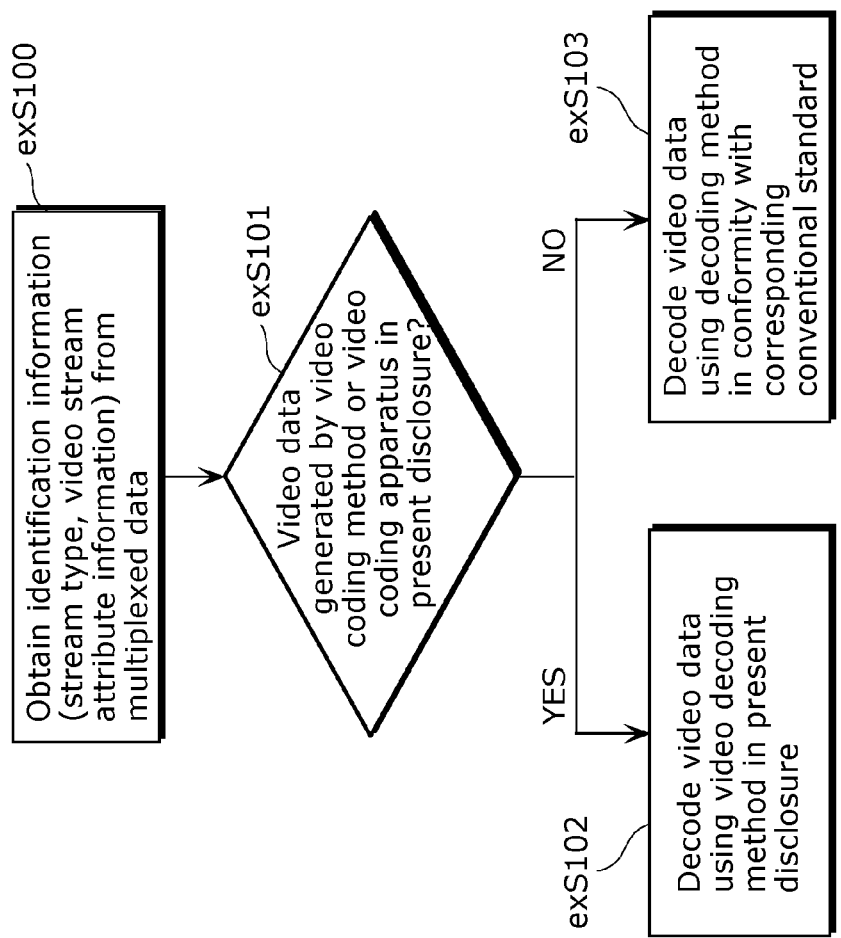
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 30:
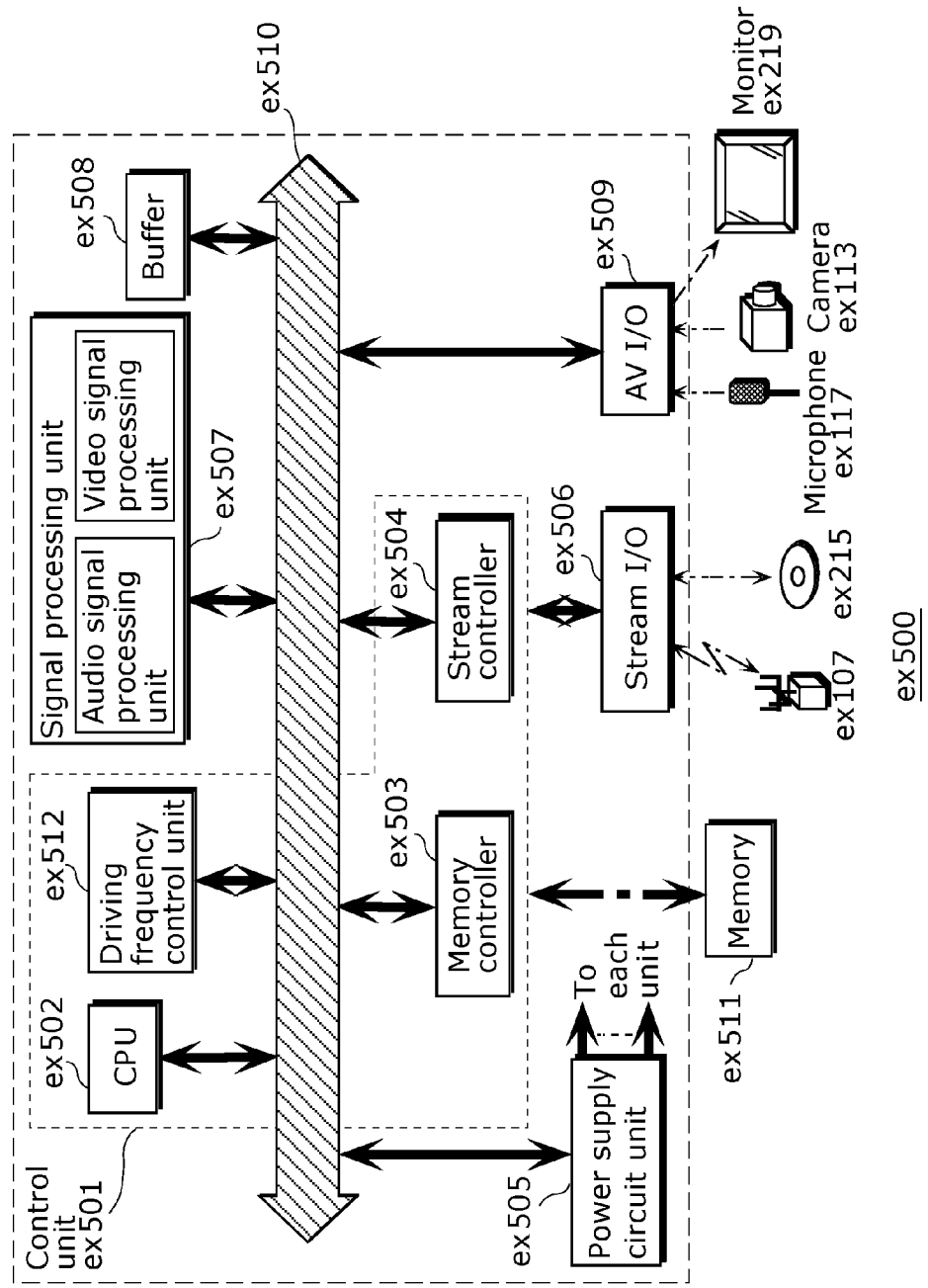
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
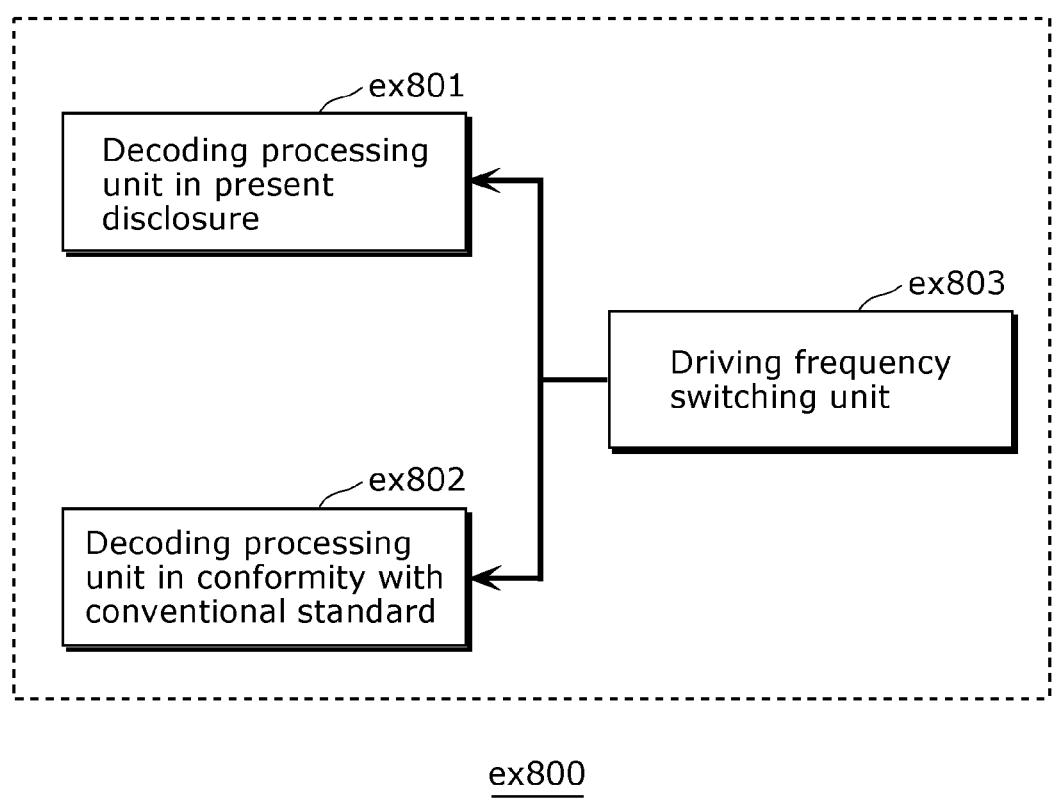
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
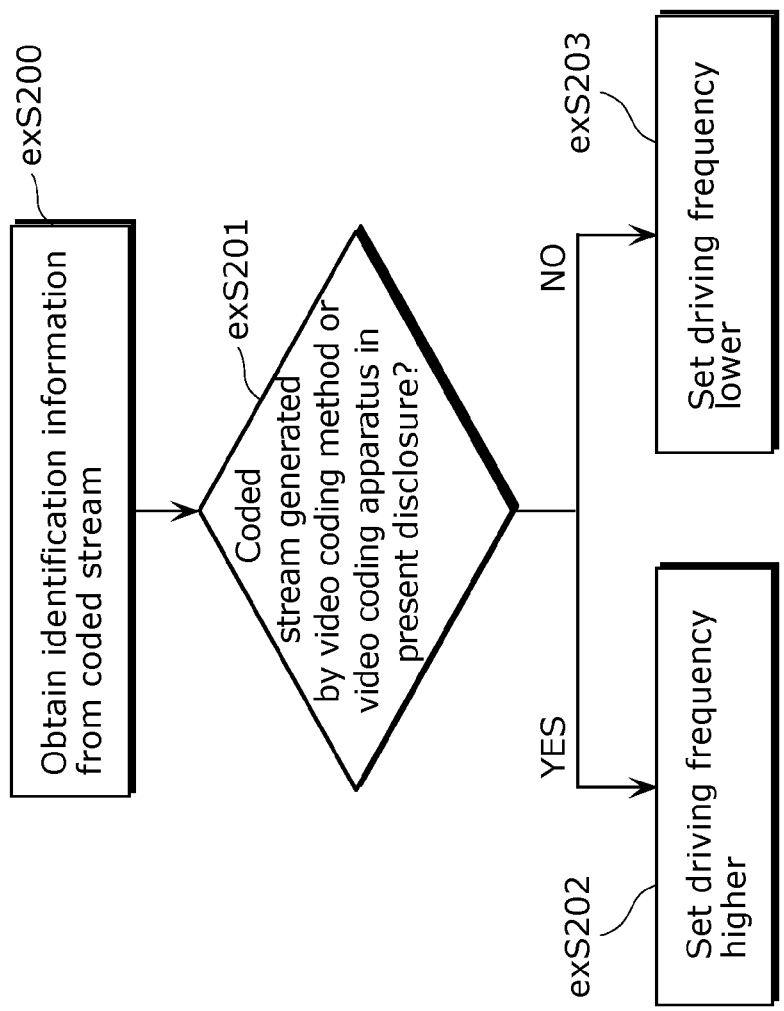
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
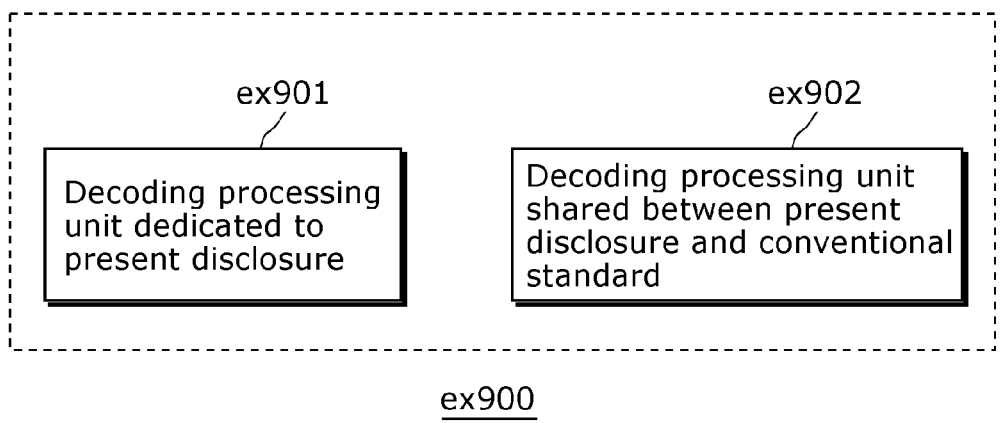
FIG. 34A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. The decoding processing unit for implementing the moving picture decoding method described in each of embodiments may be shared for the processing to be shared, and a dedicated decoding processing unit may be used for processing unique to that of MPEG-4 AVC.

Figure 34B:
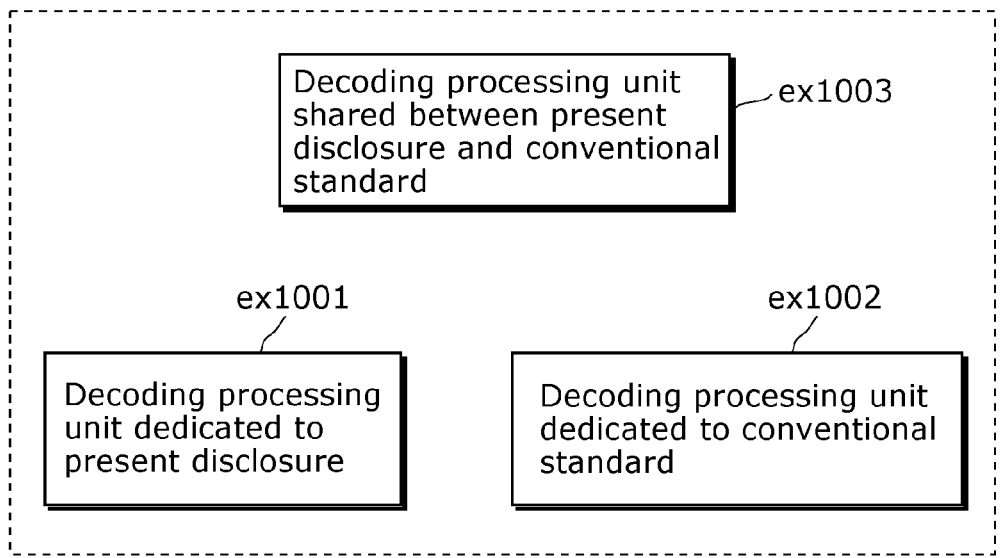
FIG. 34B is a diagram showing another example of a configuration for sharing a module of the signal processing unit.

Furthermore, ex1000 in FIG. 34B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the constituent elements of the embodiments without materially departing from the novel teachings and advantages of the subject matter recited in the appended Claims. Accordingly, all such modifications and other embodiments are included in the present disclosure.

INDUSTRIAL APPLICABILITY

An image coding method and an image decoding method according to one aspect of the present disclosure is applicable to, for example, television receivers, digital video recorders, car navigation systems, mobile phones, digital cameras, and digital video cameras.

The invention claimed is:

1. An image coding method of coding an image on a per-block basis to generate a bitstream, the image coding method comprising: performing arithmetic coding on a current block to be coded;
   determining whether or not the current block is at an end of a slice;
   determining whether or not the current block is at an end of a sub-stream when it is determined that the current block is not at the end of the slice, the sub-stream being a structural unit of the image that is different from the slice;
   performing arithmetic coding on a sub-last bit indicating the end of the sub-stream and being different from the current block when it is determined that the current block is at the end of the sub-stream;
   performing arithmetic coding termination as first termination, which is triggered by the arithmetically coded sub-last bit, when the sub-last bit is arithmetically coded;
   performing arithmetic coding termination as second termination, when it is determined that the current block is at the end of the slice; and
   performing arithmetic coding on an end-of-slice flag indicating whether or not the current block is at the end of the slice, the end-of-slice flag being different from the sub-last flag,
   wherein, when the first termination is performed, same processing as the second termination is performed,
   wherein, in the determining of whether or not the current block is at an end of a slice, when it is determined that the current block is at the end of the slice, the end-of-slice flag on which arithmetic coding has been performed indicates a predetermined value of 1, and
   wherein a value of 1 is restored by the arithmetic coding performed on the sub-last bit.

2. The image coding method according to claim 1, further comprising:
   writing a bit string into the bitstream after performing the first termination so that a bit length including the sub-stream and the sub-last bit is equal to a multiple of predetermined N bits.

3. The image coding method according to claim 2,
   wherein, in the performing of arithmetic coding on a sub-last bit, arithmetic coding is performed on a first bit of the bit string, as the sub-last bit.

4. An image coding apparatus which codes an image on a per-block basis to generate a bitstream, the image coding apparatus comprising: processing circuitry; and storage accessible from the processing circuitry, wherein the processing circuitry performs, using the storage, the image coding method according to claim 1.

* * * * *